United States Patent
Khandani

(10) Patent No.: US 11,303,424 B2
(45) Date of Patent: *Apr. 12, 2022

(54) FULL DUPLEX WIRELESS TRANSMISSION WITH SELF-INTERFERENCE CANCELLATION

(71) Applicant: Amir Keyvan Khandani, Kitchener (CA)

(72) Inventor: Amir Keyvan Khandani, Kitchener (CA)

(73) Assignee: Amir Keyvan Khandani, Kitchener (CA)

( * ) Notice: Subject to any disclaimer, the term of this patent is extended or adjusted under 35 U.S.C. 154(b) by 42 days.

This patent is subject to a terminal disclaimer.

(21) Appl. No.: 16/936,284

(22) Filed: Jul. 22, 2020

(65) Prior Publication Data

US 2020/0351072 A1 Nov. 5, 2020

Related U.S. Application Data

(63) Continuation of application No. 15/653,384, filed on Jul. 18, 2017, now Pat. No. 10,742,388, which is a
(Continued)

(51) Int. Cl.
*H04L 5/14* (2006.01)
*H04W 16/14* (2009.01)
(Continued)

(52) U.S. Cl.
CPC ............... *H04L 5/14* (2013.01); *H04B 1/123* (2013.01); *H04B 1/525* (2013.01); *H04B 7/026* (2013.01);
(Continued)

(58) Field of Classification Search
CPC ........................................................ H04L 5/14
See application file for complete search history.

(56) References Cited

U.S. PATENT DOCUMENTS 2,995,752 A 8/1961 Nicholas et al.
3,082,421 A 3/1963 Nicholas
(Continued)

FOREIGN PATENT DOCUMENTS

EP 2180623 A1 4/2010
GB 1091437 A 11/1967
(Continued)

OTHER PUBLICATIONS

International Search Report and Written Opinion for PCT/US2014/042136, dated Dec. 9, 2014, (13 pages).
(Continued)

*Primary Examiner* — Joseph E Avellino
*Assistant Examiner* — Abdeltif Ajid
(74) *Attorney, Agent, or Firm* — Invention Mine LLC

(57) ABSTRACT

Two-way (full-duplex) wireless communications. Various embodiments measure interference channels and provide for interference cancellation in both analog and digital domains to mitigate self-interference. The system supports multiple clients wherein new clients can join the network asynchronously, and also supports Multiple-Input Multiple-Output (MIMO) antennas.

20 Claims, 23 Drawing Sheets

Related U.S. Application Data continuation of application No. 13/893,288, filed on May 13, 2013, now Pat. No. 9,713,010.

(60) Provisional application No. 61/771,815, filed on Mar. 2, 2013, provisional application No. 61/646,312, filed on May 13, 2012.

(51) Int. Cl.

| | |
|---|---|
| *H04L 1/18* | (2006.01) |
| *H04B 1/12* | (2006.01) |
| *H04B 1/525* | (2015.01) |
| *H04B 7/026* | (2017.01) |
| *H04B 7/0413* | (2017.01) |
| *H04W 12/04* | (2021.01) |
| *H04B 7/0456* | (2017.01) |
| *H04B 7/06* | (2006.01) |
| *H04L 1/00* | (2006.01) |
| *H04B 7/0417* | (2017.01) |
| *H04B 7/10* | (2017.01) |

(52) U.S. Cl.
CPC ......... *H04B 7/0413* (2013.01); *H04B 7/0478* (2013.01); *H04L 1/18* (2013.01); *H04L 1/1825* (2013.01); *H04L 1/1896* (2013.01); *H04W 12/04* (2013.01); *H04W 16/14* (2013.01); *H04B 7/0417* (2013.01); *H04B 7/0626* (2013.01); *H04B 7/0669* (2013.01); *H04B 7/10* (2013.01); *H04L 2001/0097* (2013.01)

(56) References Cited

U.S. PATENT DOCUMENTS

| | | | |
|---|---|---|---|
| 3,184,747 | A | 5/1965 | Alfred |
| 3,725,920 | A | 4/1973 | Kupfer et al. |
| 3,965,475 | A | 6/1976 | Deerkoski et al. |
| 4,112,430 | A | 9/1978 | Ladstatter |
| 4,268,727 | A | 5/1981 | Agrawal et al. |
| 4,343,005 | A | 8/1982 | Han et al. |
| 4,701,935 | A | 10/1987 | Namiki |
| 4,750,165 | A | 6/1988 | Champagne et al. |
| 5,383,224 | A | 1/1995 | Mizoguchi |
| 5,388,124 | A | 2/1995 | Laroia et al. |
| 5,596,439 | A | 1/1997 | Dankberg et al. |
| 5,630,154 | A | 5/1997 | Bolstad et al. |
| 5,691,978 | A | 11/1997 | Kenworthy |
| 5,805,116 | A | 9/1998 | Morley |
| 6,034,638 | A | 3/2000 | Thiel et al. |
| 6,084,919 | A | 7/2000 | Kleider et al. |
| 6,255,997 | B1 | 7/2001 | Ratkorn et al. |
| 6,281,988 | B1 | 8/2001 | Leung |
| 6,317,092 | B1 | 11/2001 | De et al. |
| 6,369,758 | B1 | 4/2002 | Zhang |
| 6,608,864 | B1 | 8/2003 | Strait |
| 6,621,876 | B2 | 9/2003 | Camp et al. |
| 6,731,908 | B2 | 5/2004 | Berliner et al. |
| 6,745,009 | B2 | 6/2004 | Raghothaman |
| 6,781,991 | B1 | 8/2004 | Anderlind |
| 6,864,852 | B2 | 3/2005 | Chiang et al. |
| 6,870,515 | B2 | 3/2005 | Kitchener et al. |
| 6,917,597 | B1 | 7/2005 | Schmidl et al. |
| 6,934,511 | B1 | 8/2005 | Lovinggood et al. |
| 7,002,518 | B2 | 2/2006 | Lin et al. |
| 7,065,036 | B1 | 6/2006 | Ryan |
| 7,091,894 | B2 | 8/2006 | Fudge et al. |
| 7,096,042 | B2 | 8/2006 | Marinier |
| 7,184,466 | B1 | 2/2007 | Seemann et al. |
| 7,187,907 | B2 | 3/2007 | Widrow |
| 7,221,688 | B2 | 5/2007 | Vanness |
| 7,263,143 | B1 | 8/2007 | Rothaar et al. |
| 7,272,366 | B2 | 9/2007 | Haapoja et al. |
| 7,286,096 | B2 | 10/2007 | Jaffer et al. |
| 7,321,611 | B2 | 1/2008 | Fullerton |
| 7,346,100 | B2 | 3/2008 | Kumar |
| 7,471,204 | B2 | 12/2008 | Safarian et al. |
| 7,482,058 | B2 | 1/2009 | Ahmed et al. |
| 7,522,115 | B2 | 4/2009 | Waltman |
| 7,627,325 | B2 | 12/2009 | McCoy |
| 7,693,174 | B2 | 4/2010 | Ishibashi et al. |
| 7,706,744 | B2 | 4/2010 | Rodgers et al. |
| 7,817,641 | B1 * | 10/2010 | Khandani ............ H04B 7/0871 370/395.4 |
| 7,920,539 | B2 | 4/2011 | Stanford et al. |
| 7,944,871 | B2 | 5/2011 | Imamura et al. |
| 7,991,160 | B2 | 8/2011 | Guccione et al. |
| 8,023,438 | B2 | 9/2011 | Kangasmaa et al. |
| 8,031,744 | B2 | 10/2011 | Radunovic et al. |
| 8,064,502 | B2 | 11/2011 | Sawai et al. |
| 8,107,906 | B2 | 1/2012 | Lum et al. |
| 8,175,535 | B2 | 5/2012 | Mu |
| 8,184,052 | B1 | 5/2012 | Wu et al. |
| 8,184,061 | B2 | 5/2012 | Sanford |
| 8,208,628 | B2 | 6/2012 | Yener et al. |
| 8,238,551 | B2 | 8/2012 | Reznik et al. |
| 8,280,046 | B2 | 10/2012 | Rudolf et al. |
| 8,306,480 | B2 | 11/2012 | Muhammad et al. |
| 8,351,874 | B2 | 1/2013 | Dent et al. |
| 8,373,582 | B2 | 2/2013 | Hoffberg |
| 8,385,235 | B2 | 2/2013 | Chiu et al. |
| 8,401,196 | B2 | 3/2013 | Goldberg et al. |
| 8,405,543 | B2 | 3/2013 | Kluge et al. |
| 8,423,986 | B1 | 4/2013 | Grechanik |
| 8,498,585 | B2 | 7/2013 | Vandenameele |
| 8,520,855 | B1 | 8/2013 | Kohno et al. |
| 8,587,492 | B2 | 11/2013 | Runyon |
| 8,628,650 | B2 | 1/2014 | Ah et al. |
| 8,629,650 | B2 | 1/2014 | Mohammadian et al. |
| 8,644,768 | B2 | 2/2014 | Kluge et al. |
| 8,744,377 | B2 | 6/2014 | Rimini et al. |
| 8,767,869 | B2 | 7/2014 | Rimini et al. |
| 8,823,577 | B2 | 9/2014 | Smid et al. |
| 8,836,581 | B2 | 9/2014 | Nysen |
| 8,836,601 | B2 | 9/2014 | Sanford et al. |
| 8,836,606 | B2 | 9/2014 | Kish et al. |
| 8,837,615 | B2 | 9/2014 | Baldemair |
| 8,842,044 | B2 | 9/2014 | Nysen et al. |
| 8,860,629 | B2 | 10/2014 | Shtrom et al. |
| 8,897,269 | B2 | 11/2014 | Ji et al. |
| 8,918,692 | B2 | 12/2014 | Braithwaite |
| 8,976,641 | B2 | 3/2015 | Choi et al. |
| 9,019,165 | B2 | 4/2015 | Shtrom et al. |
| 9,036,749 | B2 | 5/2015 | Choi et al. |
| 9,054,795 | B2 | 6/2015 | Choi et al. |
| 9,059,879 | B2 | 6/2015 | Jaeger et al. |
| 9,071,313 | B2 | 6/2015 | Monsen |
| 9,077,071 | B2 | 7/2015 | Shtrom et al. |
| 9,077,407 | B2 | 7/2015 | Koren et al. |
| 9,077,421 | B1 | 7/2015 | Mehlman et al. |
| 9,093,758 | B2 | 7/2015 | Kish et al. |
| 9,130,693 | B2 | 9/2015 | Reznik et al. |
| 9,246,234 | B2 | 1/2016 | Rao et al. |
| 9,276,682 | B2 | 3/2016 | Bharadia et al. |
| 9,277,591 | B2 | 3/2016 | Amini et al. |
| 9,281,979 | B2 | 3/2016 | Maltsev et al. |
| 9,337,885 | B2 | 5/2016 | Mehlman et al. |
| 9,571,205 | B1 | 2/2017 | Suarez et al. |
| 9,608,705 | B2 | 3/2017 | Maru |
| 9,622,098 | B2 | 4/2017 | Emmanuel et al. |
| 9,713,010 | B2 | 7/2017 | Khandani |
| 9,791,552 | B1 | 10/2017 | Schuman |
| 10,067,746 | B1 | 9/2018 | Yu |
| 10,068,228 | B1 | 9/2018 | Winklevoss et al. |
| 10,069,479 | B1 | 9/2018 | Desclos |
| 2001/0010495 | A1 | 8/2001 | Helms et al. |
| 2001/0024434 | A1 | 9/2001 | Ayyagari et al. |
| 2002/0028655 | A1 | 3/2002 | Rosener et al. |
| 2002/0032004 | A1 | 3/2002 | Widrow |
| 2002/0097810 | A1 | 7/2002 | Seki |
| 2003/0043071 | A1 | 3/2003 | Lilly et al. |
| 2003/0114128 | A1 | 6/2003 | Haapoja et al. |
| 2003/0189974 | A1 | 10/2003 | Ferry |
| 2003/0189975 | A1 | 10/2003 | Fullerton |

(56) References Cited

U.S. PATENT DOCUMENTS

| | | |
|---|---|---|
| 2003/0206579 A1 | 11/2003 | Bryant |
| 2004/0022229 A1 | 2/2004 | Vanness |
| 2004/0027304 A1 | 2/2004 | Chiang et al. |
| 2004/0076246 A1 | 4/2004 | Vanderperren et al. |
| 2004/0106381 A1 | 6/2004 | Tiller |
| 2004/0132414 A1 | 7/2004 | Sendyk et al. |
| 2005/0020771 A1 | 1/2005 | Ahmed et al. |
| 2005/0024540 A1 | 2/2005 | Kim et al. |
| 2005/0052330 A1 | 3/2005 | Mehltretter |
| 2005/0057420 A1 | 3/2005 | Lin et al. |
| 2005/0083863 A1 | 4/2005 | Umei et al. |
| 2005/0129223 A1 | 6/2005 | Piket et al. |
| 2005/0275576 A1 | 12/2005 | Fudge et al. |
| 2006/0014491 A1 | 1/2006 | Cleveland |
| 2006/0045063 A1 | 3/2006 | Stanford et al. |
| 2006/0109067 A1 | 5/2006 | Shtrom |
| 2006/0192720 A1 | 8/2006 | Shtrom |
| 2007/0026804 A1 | 2/2007 | Ishibashi et al. |
| 2007/0026807 A1 | 2/2007 | Kish |
| 2007/0036353 A1 | 2/2007 | Reznik et al. |
| 2007/0057860 A1 | 3/2007 | Jaffer et al. |
| 2007/0063875 A1 | 3/2007 | Hoffberg |
| 2007/0070902 A1 | 3/2007 | Elaoud et al. |
| 2007/0080891 A1 | 4/2007 | De et al. |
| 2007/0082617 A1 | 4/2007 | McCallister |
| 2007/0082622 A1 | 4/2007 | Leinonen et al. |
| 2007/0118749 A1 | 5/2007 | Hagn et al. |
| 2007/0132651 A1 | 6/2007 | Nilsson |
| 2007/0189528 A1 | 8/2007 | Ueda |
| 2007/0254692 A1 | 11/2007 | McCoy |
| 2008/0009257 A1 | 1/2008 | Safarian et al. |
| 2008/0063113 A1 | 3/2008 | Gao et al. |
| 2008/0107046 A1 | 5/2008 | Kangasmaa et al. |
| 2008/0123851 A1 | 5/2008 | Guccione et al. |
| 2008/0125033 A1 | 5/2008 | Lee |
| 2008/0129640 A1 | 6/2008 | Shtrom et al. |
| 2008/0165874 A1 | 7/2008 | Steele et al. |
| 2008/0233966 A1 | 9/2008 | Scheim et al. |
| 2008/0294970 A1 | 11/2008 | Gross et al. |
| 2009/0092072 A1 | 4/2009 | Imamura et al. |
| 2009/0100313 A1 | 4/2009 | Gross et al. |
| 2009/0135748 A1* | 5/2009 | Lindoff ............... H04W 72/048 370/296 |
| 2009/0141900 A1 | 6/2009 | Ye et al. |
| 2009/0186582 A1 | 7/2009 | Muhammad et al. |
| 2009/0190558 A1 | 7/2009 | Strutt et al. |
| 2009/0213770 A1 | 8/2009 | Mu |
| 2009/0253385 A1 | 10/2009 | Dent et al. |
| 2009/0284218 A1 | 11/2009 | Mohammadian et al. |
| 2009/0323582 A1 | 12/2009 | Proctor et al. |
| 2010/0003931 A1 | 1/2010 | Krishnan et al. |
| 2010/0008406 A1 | 1/2010 | Sawai et al. |
| 2010/0020771 A1 | 1/2010 | Ji et al. |
| 2010/0022201 A1 | 1/2010 | Vandenameele |
| 2010/0086012 A1 | 4/2010 | Rofougaran et al. |
| 2010/0165866 A1 | 7/2010 | Sachse et al. |
| 2010/0165895 A1 | 7/2010 | Elahi et al. |
| 2010/0167662 A1 | 7/2010 | Kluge et al. |
| 2010/0232324 A1 | 9/2010 | Radunovic et al. |
| 2010/0248714 A1 | 9/2010 | Kang et al. |
| 2010/0271987 A1 | 10/2010 | Chiu et al. |
| 2010/0321245 A1 | 12/2010 | Aoki |
| 2010/0322225 A1 | 12/2010 | Kumar |
| 2011/0080325 A1 | 4/2011 | Livneh et al. |
| 2011/0110451 A1 | 5/2011 | Tsai et al. |
| 2011/0116639 A1* | 5/2011 | Yamada ............... G10L 19/008 381/17 |
| 2011/0143655 A1 | 6/2011 | Ahn et al. |
| 2011/0149714 A1 | 6/2011 | Rimini et al. |
| 2011/0268100 A1 | 11/2011 | Gorokhov et al. |
| 2012/0027113 A1 | 2/2012 | Gaal et al. |
| 2012/0068904 A1 | 3/2012 | Shtrom |
| 2012/0087424 A1 | 4/2012 | Brown et al. |
| 2012/0113862 A1* | 5/2012 | Santhanam ........ H04W 84/045 370/254 |
| 2012/0159279 A1 | 6/2012 | Braithwaite |
| 2012/0200158 A1 | 8/2012 | Takei |
| 2012/0201153 A1 | 8/2012 | Bharadia et al. |
| 2012/0201173 A1* | 8/2012 | Jain ..................... H04B 1/525 370/277 |
| 2012/0220246 A1 | 8/2012 | Kushnir et al. |
| 2012/0281834 A1 | 11/2012 | Reznik et al. |
| 2012/0300680 A1 | 11/2012 | Pietsch et al. |
| 2012/0327881 A1* | 12/2012 | Nakano ............... H04B 7/0452 370/329 |
| 2013/0010851 A1 | 1/2013 | Jaeger et al. |
| 2013/0044791 A1 | 2/2013 | Rimini et al. |
| 2013/0089009 A1 | 4/2013 | Li et al. |
| 2013/0089021 A1 | 4/2013 | Gaal et al. |
| 2013/0099974 A1 | 4/2013 | Wang et al. |
| 2013/0102254 A1 | 4/2013 | Cyzs et al. |
| 2013/0114468 A1 | 5/2013 | Hui et al. |
| 2013/0286903 A1 | 10/2013 | Khojastepour et al. |
| 2013/0301487 A1 | 11/2013 | Khandani |
| 2014/0006797 A1 | 1/2014 | Cordella et al. |
| 2014/0126675 A1 | 5/2014 | Monsen |
| 2014/0135056 A1 | 5/2014 | Wang |
| 2014/0157367 A1 | 6/2014 | Zhang |
| 2014/0169236 A1 | 6/2014 | Choi et al. |
| 2014/0204808 A1 | 7/2014 | Choi et al. |
| 2014/0210681 A1 | 7/2014 | Shtrom |
| 2014/0218248 A1 | 8/2014 | Schulz et al. |
| 2014/0219139 A1 | 8/2014 | Choi et al. |
| 2014/0225788 A1 | 8/2014 | Schulz et al. |
| 2014/0269964 A1 | 9/2014 | Du et al. |
| 2014/0331061 A1 | 11/2014 | Wright et al. |
| 2014/0333466 A1 | 11/2014 | Mohamadi |
| 2014/0334322 A1 | 11/2014 | Shtrom et al. |
| 2014/0348018 A1* | 11/2014 | Bharadia ............ H04L 5/1423 370/252 |
| 2014/0348032 A1 | 11/2014 | Hua et al. |
| 2014/0363008 A1 | 12/2014 | Chen et al. |
| 2015/0029906 A1 | 1/2015 | Jana et al. |
| 2015/0043323 A1 | 2/2015 | Choi et al. |
| 2015/0043685 A1 | 2/2015 | Choi et al. |
| 2015/0049834 A1 | 2/2015 | Choi et al. |
| 2015/0063176 A1 | 3/2015 | Hong et al. |
| 2015/0070243 A1 | 3/2015 | Kish et al. |
| 2015/0078217 A1 | 3/2015 | Choi et al. |
| 2015/0085830 A1 | 3/2015 | Nozaki et al. |
| 2015/0139284 A1 | 5/2015 | Choi et al. |
| 2015/0171903 A1 | 6/2015 | Mehlman et al. |
| 2015/0188646 A1 | 7/2015 | Bharadia et al. |
| 2015/0223173 A1 | 8/2015 | Khojastepour et al. |
| 2015/0236750 A1 | 8/2015 | Choi et al. |
| 2015/0249997 A1 | 9/2015 | Clegg |
| 2015/0261973 A1 | 9/2015 | Ohare et al. |
| 2015/0263780 A1 | 9/2015 | Mehlman et al. |
| 2015/0280893 A1 | 10/2015 | Choi et al. |
| 2015/0311599 A1 | 10/2015 | Shtrom et al. |
| 2015/0312905 A1* | 10/2015 | Seo ..................... H04B 7/2656 370/280 |
| 2015/0318976 A1 | 11/2015 | Eltawil et al. |
| 2015/0333847 A1 | 11/2015 | Bharadia et al. |
| 2015/0334745 A1 | 11/2015 | Zhao |
| 2015/0341125 A1 | 11/2015 | Bharadia et al. |
| 2015/0341879 A1 | 11/2015 | Shtrom et al. |
| 2016/0127876 A1 | 5/2016 | Kish et al. |
| 2016/0226653 A1 | 8/2016 | Bharadia et al. |
| 2016/0248160 A1 | 8/2016 | Shtrom |
| 2016/0249376 A1 | 8/2016 | Kish |
| 2016/0283937 A1 | 9/2016 | Reese et al. |
| 2017/0012696 A1 | 1/2017 | Jang |
| 2017/0161635 A1 | 6/2017 | Oono et al. |
| 2017/0195003 A1 | 7/2017 | Rosson et al. |
| 2018/0075347 A1 | 3/2018 | Alistarh et al. |
| 2018/0234162 A1 | 8/2018 | Kim |

(56) References Cited

U.S. PATENT DOCUMENTS

2018/0288019 A1    10/2018   Dinia et al.
2018/0373978 A1    12/2018   Yu et al.

FOREIGN PATENT DOCUMENTS

| | | |
|---|---|---|
| JP | H10502220 A | 2/1998 |
| KR | 20040096404 A | 11/2004 |
| KR | 20070072629 A | 7/2007 |
| KR | 20120080231 A | 7/2012 |
| WO | 9428585 A1 | 12/1994 |
| WO | 9622643 A1 | 7/1996 |
| WO | 03098823 A1 | 11/2003 |
| WO | 2004007497 A1 | 1/2004 |
| WO | 2009156510 A2 | 12/2009 |
| WO | 2010005951 A2 | 1/2010 |
| WO | 2010051232 A1 | 5/2010 |
| WO | 2011065020 A1 | 6/2011 |
| WO | 2011148341 A1 | 12/2011 |
| WO | 2012042256 A1 | 4/2012 |
| WO | 2016014016 A1 | 1/2016 |

OTHER PUBLICATIONS

European Extended Search Report for EP App. No. 13790160.9, dated Jan. 20, 2016, (9 pages).
International Search Report and Written Opinion for PCT/US2013/040822, dated Jul. 18, 2013, (8 pages).
International Search Report for PCT/US2013/040818, dated Jul. 24, 2013, (2 pages).
European Extended Search Report for EP App. No. 14865287.8, dated Jul. 4, 2017, (7 pages).
European Extended Search Report for EP App. No. 13790076.7, dated Mar. 2, 2016, (8 pages).
International Search Report and Written Opinion from PCT/US2014/050968, dated Nov. 19, 2014, (9 pages).
International Search Report and Written Opinion for PCT/US2014/051137, dated Nov. 24, 2014, (10 pages).
European Extended Search Report for EP App. No. 13790948.7, dated Nov. 4, 2015, (9 pages).
Aono, Tomoyuki, et al., "Wireless secret key generation exploiting reactance-domain scalar response of multipath fading channels", IEEE Transactions on Antennas and Propagation, IEEE Service Center, Piscataway, NJ, US, vol. 53, No. 11; XP001512766, ISSN: 0018-926X, DOI: 10.1109/TAP.2005.858853, Nov. 2005, 3776-3784.
Chen, Brian , et al., "Quantization Index Modulation: A Class of Provably Good Methods for Digital Watermarking and Information Embedding", IEEE Transaction on Information Theory, vol. 47, May 2001, 1423-1443.
Choi, Jung Il, et al., "Achieving Single Channel, Full Duplex Wireless Communication", Proceedings from the Annual International Conference on Mobile Computing and Networking, MOBICOM-MOBICOM 10 and MOBIHOC 10—Proceedings of the 16th Annual Intl Conference on Mobile Computing and Networking and 11th ACM Intl Symposi, XP002696691., Sep. 20, 2010, 1-12.
Gharavol, Ebrahim A, et al., "Robust Joint Optimization of MIMO Two-Way Relay Channels With Imperfect CSI", 2011 49th Annual Allerton Conference on Communication, Control, and Computing (Allerton), Monticello, IL, USA , IEEE, Sep. 28, 2011, 1665-1669.
IPRP , International Preliminary Report on Patentability for PCT/US2013/040822, dated Nov. 18, 2014, (6 pages).
Jain, Mayank , et al., "Practical, Real-Time, Full Duplex Wireless", MobiCom '11 Proceedings of the 17th annual International conference on Mobile computing and networking; Las Vegas, Nevada, USA, Sep. 19, 2011, 1-12.
Khandani, Amir K, "Two-way (true full-duplex) wireless", 2013 13th Canadian Workshop on Information Theory, IEEE, XP032495648, DOI: 10.1109/CWIT.2013.6621588 , [retrieved on Oct. 4, 2013], Jun. 18, 2013, 33-38.
Mcmichael, Joseph G, et al., "Optimal tuning of analog self-interference cancellers for full-duplex wireless communication", 2012 50th Annual Allerton Conference on Communication, Control, and Computing (Allerton), IEEE, Monticello, IL, USA, Oct. 1, 2012, 246-251.
Persson, Daniel , et al., "Joint Source-Channel Coding for the MIMO Broadcast Channel", IEEE Transactions on Signal Processing, vol. 60, No. 4, IEEE Signal Processing Society, Dec. 21, 2011, 2085-2090.
Vaze, Rahul , et al., "To Code or Not to Code in Multi-Hop Relay Channels", arxiv.org, Cornell University Library, May 20, 2008, 1-30.
Ding, Cunsheng , et al., "A Generic Construction of Cartesian Authentication Codes", IEEE Transactions on Information Theory, vol. 53, No. 6, Jun. 2007, 2229-2235.

\* cited by examiner

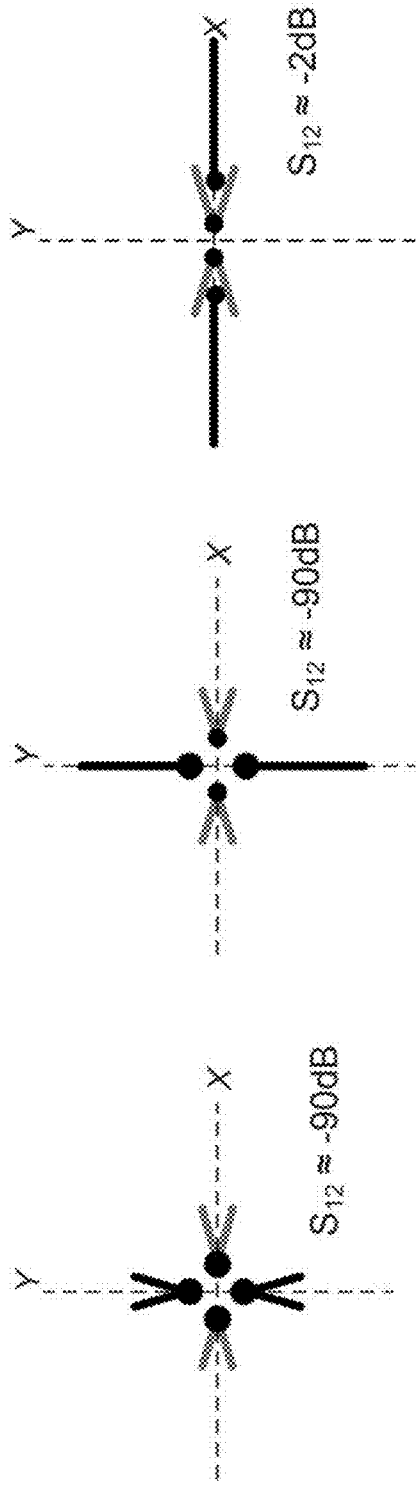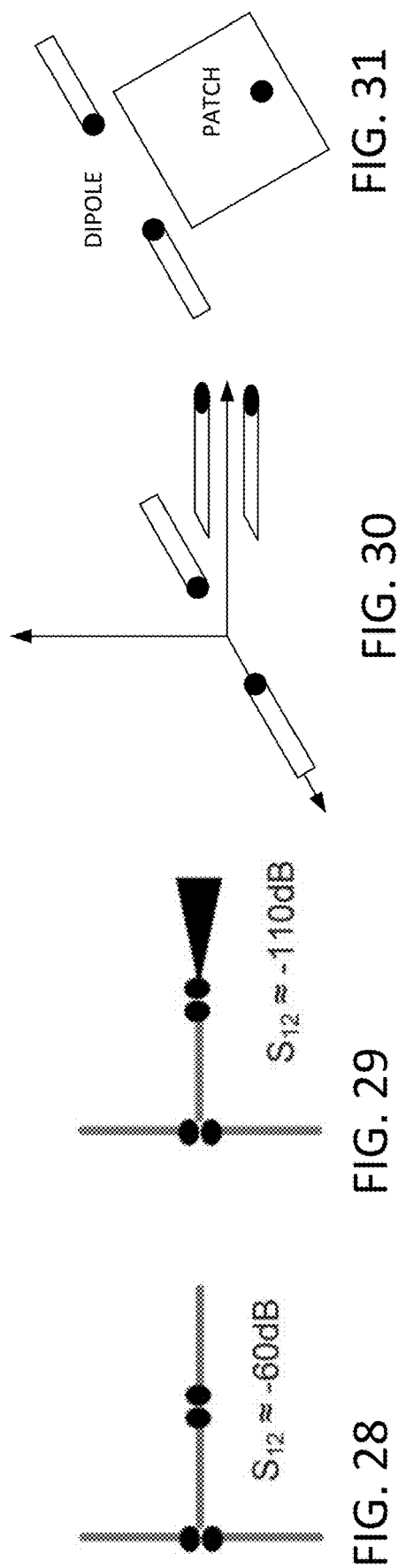

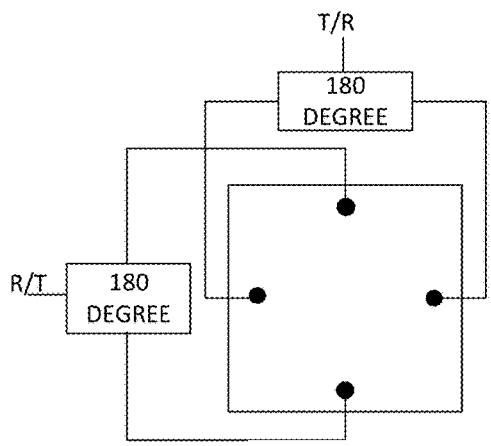
FIG. 32
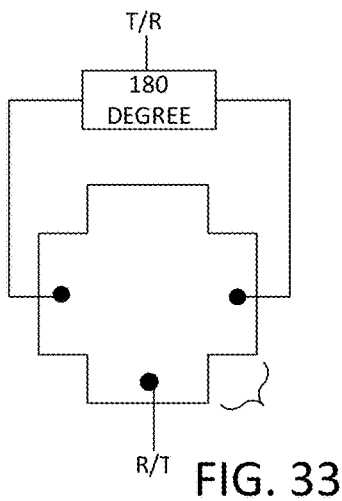
FIG. 33
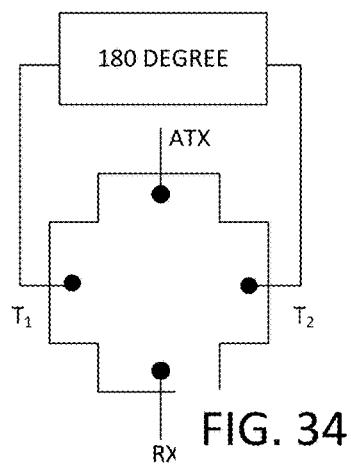
FIG. 34
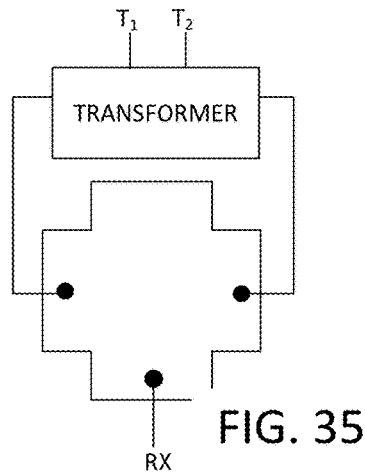
FIG. 35
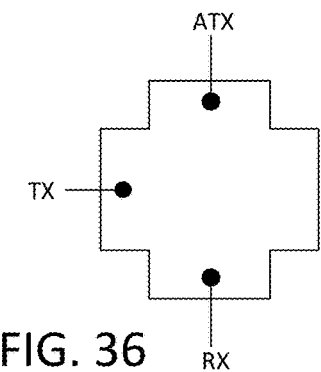
FIG. 36
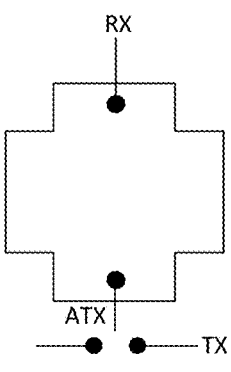
FIG. 37
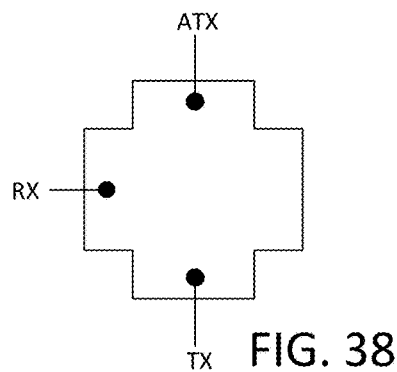
FIG. 38

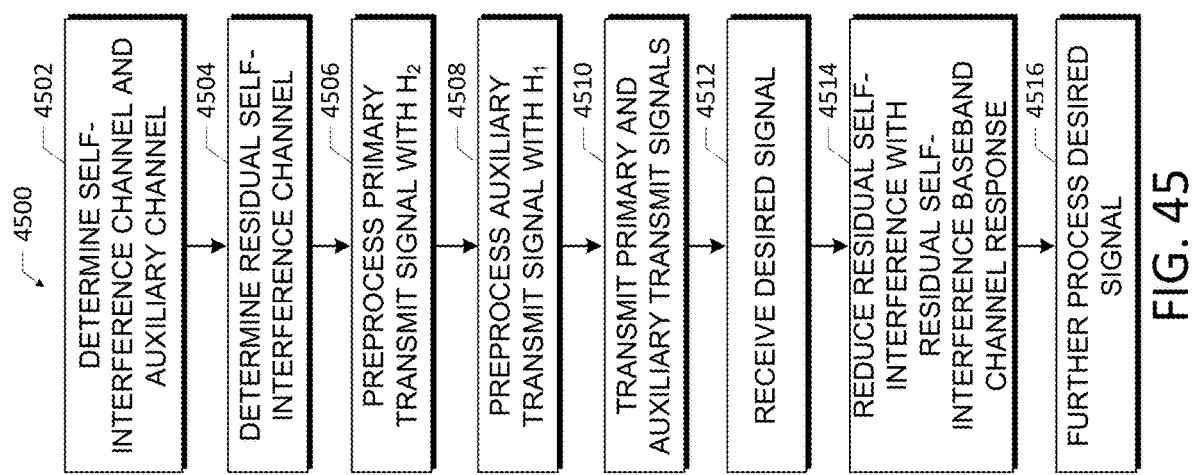
FIG. 45
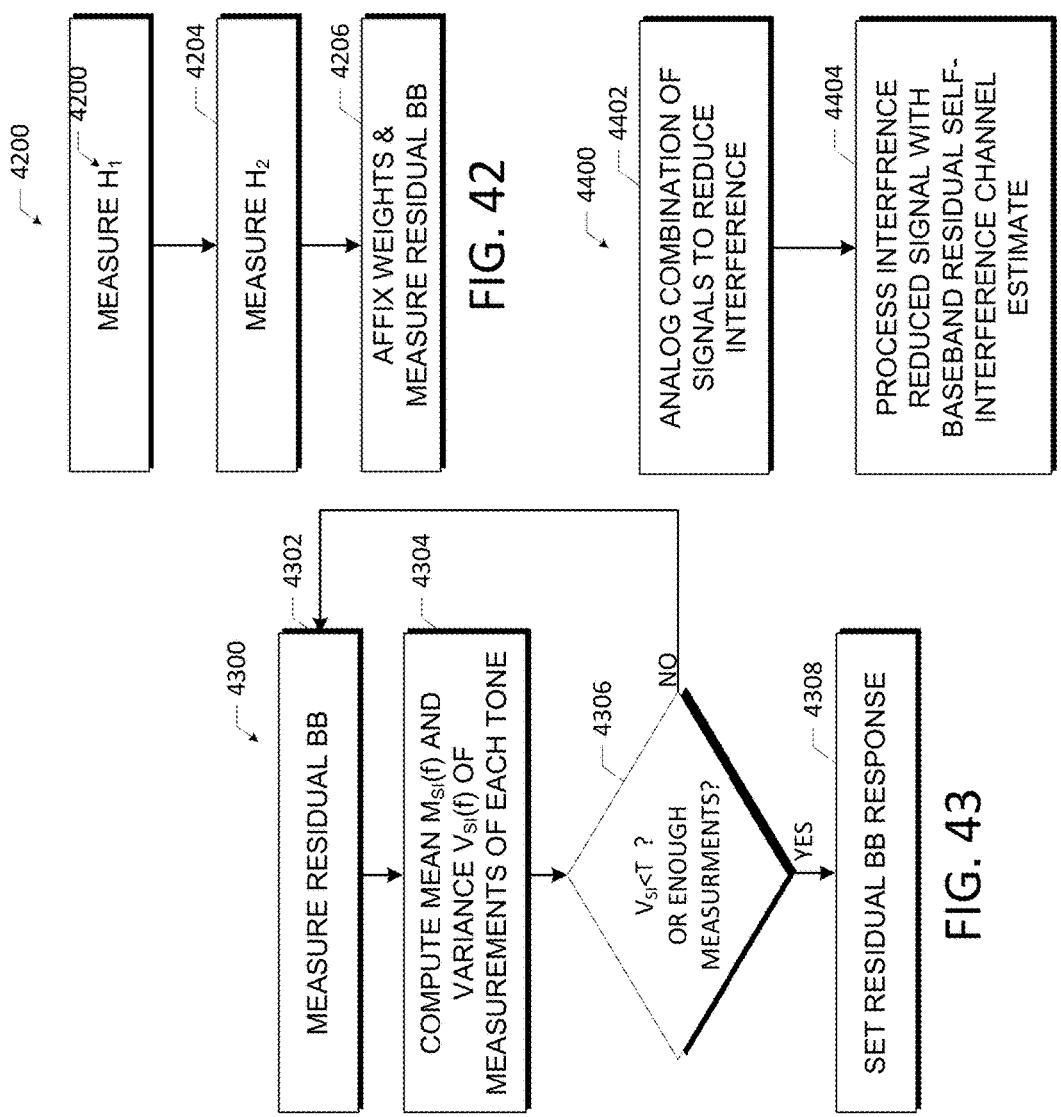
FIG. 42
FIG. 44
FIG. 43

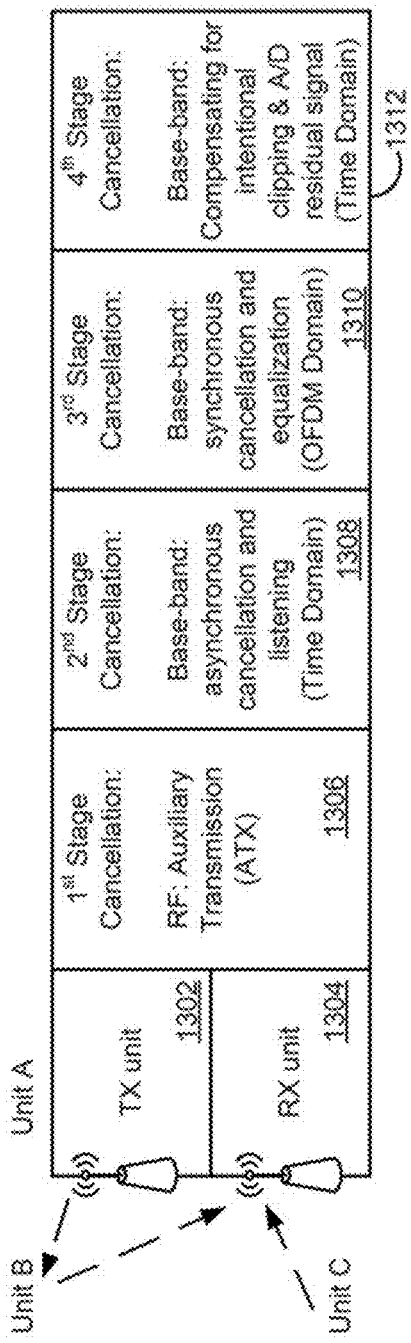
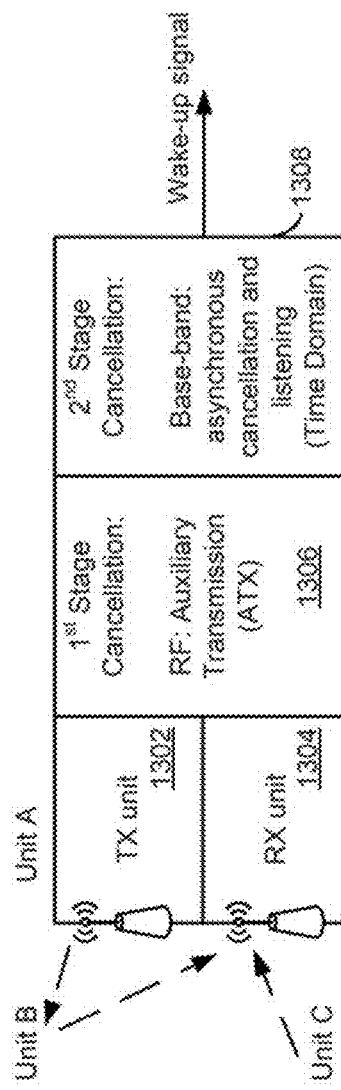
FIG. 51
FIG. 52

FULL DUPLEX WIRELESS TRANSMISSION WITH SELF-INTERFERENCE CANCELLATION

CROSS-REFERENCE TO RELATED APPLICATIONS

The present application is a continuation of, and claims the benefit under 35 U.S.C. § 120 from U.S. patent application Ser. No. 15/653,384, filed Jul. 18, 2017, entitled "Full Duplex Wireless Transmission with Self-Interference Cancellation," which is hereby incorporated herein by reference, and which in turn is a continuation of, and claims the benefit under 35 U.S.C. § 120 from U.S. Pat. No. 9,713,010, issued Jul. 18, 2017, entitled "Full Duplex Wireless Transmission with Self-Interference Cancellation," which in turn is a non-provisional filing of, and claims the benefit under 35 U.S.C. § 119(e) from, U.S. Provisional Patent Application Ser. No. 61/646,312, filed May 13, 2012, and U.S. Provisional Patent Application Ser. No. 61/771,815, filed Mar. 2, 2013, both of which are hereby incorporated herein by reference. In addition, this application is related to the following applications, all of which are also incorporated herein by reference: U.S. application Ser. No. 13/892,296, entitled "Wireless Transmission with Channel State Perturbation," filed May 13, 2013, U.S. application Ser. No. 13/893,297, entitled "Full Duplex Wireless Transmission with Channel Phase-Based Encryption," filed May 13, 2013, and U.S. application Ser. No. 13/893,299, entitled "Distributed Collaborative Signaling in Full Duplex Wireless Transceivers," filed May 13, 2013.

FIELD OF THE INVENTION

The present disclosure relates to wireless communications. In particular, the present disclosure relates to systems and methods to establish two-way (full-duplex) wireless links with support for the use of multiple transmit, multiple receive antennas.

BACKGROUND OF THE INVENTION

A communication link (e.g. between node A and node B) with the capability to support the connection in both directions at the same time is called full-duplex, or two-way. In contrast, a link that can support the connection in only one direction at a time is called one-way or half-duplex. In a network environment with several nodes, it is desirable that communication nodes can simultaneously communicate in both directions, that is, to talk and listen at the same time.

Current wireless systems are one-way and rely on either separate time slots (Time Division Duplex) or separate frequency bands (Frequency Division Duplex) to transmit and to receive. These alternatives have their relative pros and cons, but both suffer from lack of ability to transmit and to receive simultaneously and over the entire frequency band. Even in the context of Orthogonal Frequency Division Multiple Access (OFDMA), where different frequency tones are used to simultaneously service multiple users, there is no method known to use the tones in opposite directions. A similar shortcoming exists in the context of Code Division Multiple Access (CDMA) where different codes are used to separate users. It is well known that two-way wireless is theoretically possible, but it is widely believed to be difficult to implement due to a potentially large amount of interference, called self-interference, between transmit and receive chains of the same node.

Full-duplex communications is used in many telecommunications technologies, e.g., ordinary wired telephones, Digital Subscriber Line (DSL), wireless with directional antennas, free space optics, and fiber optics. The impact of full-duplex links in these earlier applications is limited to doubling the rate by providing two symmetrical pipes of data flowing in opposite directions. This affects the point-to-point throughput with no direct impact on networking and security issues. In contrast, in multi-user wireless systems, due to the nature of transmission that everyone hears everyone else, full-duplex capability provides new ways to facilitate networking and enhance security.

Although full-duplex is currently used for example in wireless systems with highly directional antennas or free space optics, the underlying full-duplex radios are essentially nothing but two independent half-duplex systems separated in space. In fact, the general two-way channel is very difficult to realize in wireless communications due to excessive amounts of self-interference, i.e., the interference each transmitter generates for the receiver(s) in the same node.

Other prior art techniques to provide a type communication system that might be referred to as full-duplex are really frequency division duplex (FDD), where separate frequency ranges are used in the transmit and receive (uplink/downlink) directions. As used herein, however, the term full-duplex is intended to refer to simultaneous transmission and reception of signals within the same frequency band.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 25-27 shows examples of some antenna structures showing that the coupling between antennas can be very strong (−2 dB) due to near field signals unless it is cancelled relying on pair-wise symmetry.

FIGS. 28 and 29 show numerical results (2.4 Ghz band using HFSS) for one example of modifying the shape of the antenna.

FIGS. 30 and 31 show a schematic view of two pair-wise symmetrical antennas.

FIGS. 32 and 33 show a schematic view of two symmetrical antennas.

FIGS. 34, 35, 36, 37, and 38 show five configurations wherein antennas have shared arm above ground plane.

FIG. 42 shows a method of measuring the self-interference channel response, the self-interference cancellation channel response, and the residual baseband channel response according to one embodiment.

FIG. 43 shows a flow diagram of setting the residual baseband response according to one embodiment.

FIG. 44 shows a signal processing flow diagram according to one embodiment.

FIG. 45 shows a signal processing flow diagram according to an alternative embodiment.

FIGS. 51, 52, and 53 are embodiments relating to an asynchronous control network.

Figure 1:
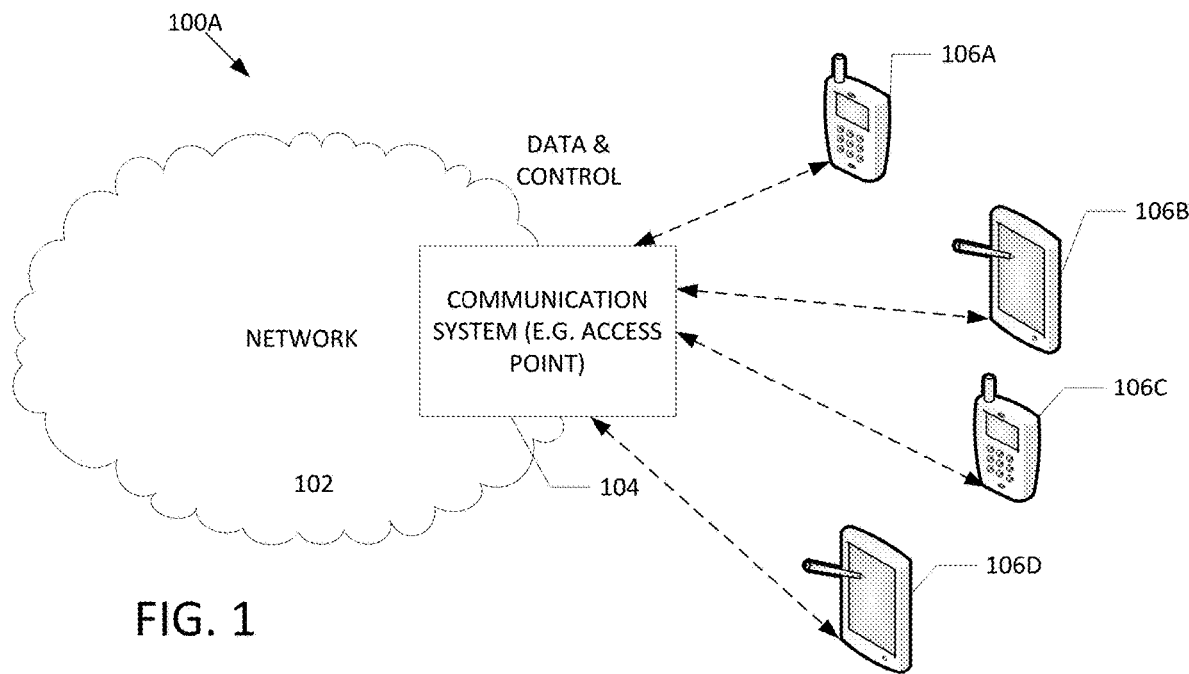
FIG. 1 is a block diagram of a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

This disclosure relates to the design of a full-duplex radio. In its simplest from, a full-duplex radio has separate antennas for transmission and reception. The transmit and receive antennas may often be placed in the vicinity of each other and consequently a strong self-interference may be observed at the receive antenna. The description herein illustrates systems and methods for practical implementation of full-duplex wireless using a primary transmit signal and auxiliary transmit signal to reduce interference, and a residual self-interference cancellation signal. To this aim, new self-interference cancellation techniques are deployed.

In one embodiment, a method of full-duplex communication may comprise: in a full duplex transceiver, generating an interference-reduced signal by combining an analog self-interference cancellation signal to an incoming signal that includes a desired signal and a self-interference signal, wherein the analog self-interference cancellation signal destructively adds to the self-interference signal to create a residual self-interference signal. Then, the method may include further processing the interference-reduced signal to further reduce the residual self-interference signal using a baseband residual self-interference channel estimate.

In a further embodiment, the method may comprise: determining an estimate of a self-interference channel response from a primary transmitter of a transceiver to a receiver of the transceiver and determining an estimate of an auxiliary channel response from an auxiliary transmitter of the transceiver to the receiver. Then, the method may include determining a residual self-interference baseband channel response at a baseband processor of the receiver. Full-duplex communication is performed by preprocessing a primary transmit signal and an auxiliary transmit signal with the estimated auxiliary channel response and a negative of the estimated self-interference channel response, respectively, and transmitting the preprocessed primary transmit signal and the preprocessed auxiliary transmit signal in a transmit frequency range, while receiving a desired signal within a receive frequency range substantially overlapping the transmit frequency range, and receiving a residual self-interference signal. Further, the method may reduce the residual self-interference signal using the residual self-interference baseband channel response; and, further processing the desired signal.

In a further embodiment, an apparatus may comprise: a weight calculation unit configured to measure a self-interference channel and an auxiliary channel to obtain an estimate of the self-interference channel and an estimate of the auxiliary channel; a full-duplex transceiver having a primary transmitter, an auxiliary transmitter, and a receiver, wherein the primary transmitter and auxiliary transmitter are configured to preprocess a training sequence to generate two transmit signals such that the two transmit signals respectively traverse the self-interference channel and the auxiliary channel and combine to form an analog residual interference signal at the receiver of the full-duplex transceiver; an analog to digital converter and a receiver baseband processor at the receiver being configured to measure a baseband residual self-interference channel response by; and, the transceiver being further configured to cancel self-interference signals using the auxiliary channel and to cancel residual self-interference signals using the measured baseband residual self-interference channel response. In particular, the full-duplex transceiver may communicate in full-duplex by transmitting information in a first frequency band to a second receiver while simultaneously receiving information in the first frequency band from a second transmitter by cancelling self-interference signals using the auxiliary channel and cancelling residual self-interference signals using the measured baseband residual self-interference channel response.

Figure 2:
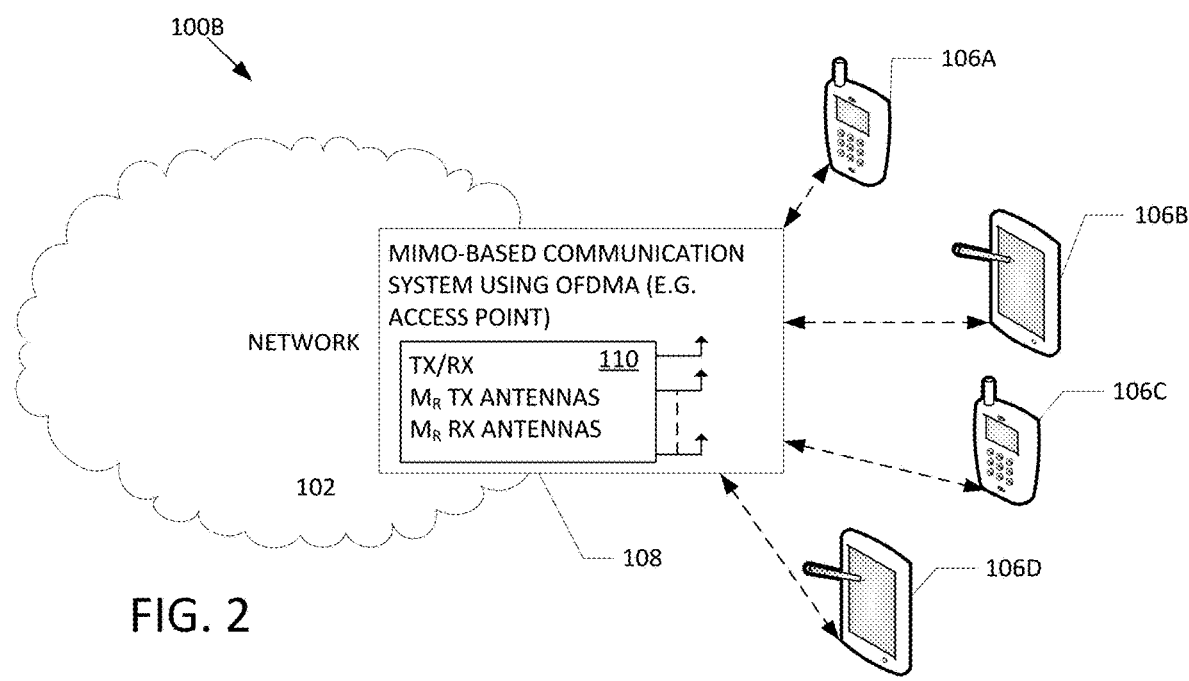
FIG. 2 is a block diagram of a wireless communication system in accordance with some embodiments.

FIG. 1 and FIG. 2 show block diagrams of a communication network in which an access point (AP), which can be, e.g., a base-station in a cellular setup, is communicating with multiple clients with full-duplex links to each client. The access point of FIG. 1 communicates with multiple clients using OFDMA for sharing the bandwidth among users with full-duplex link over each OFDM tone and with support for multiple transmit and multiple receive antennas. The full duplex communication networks 100A and 100B, albeit simplified, show an access point (AP) (e.g. 104 or 108) that is communicating with multiple clients (106A, 106 B 106C and 106D) with full-duplex links to each client. Access point 108 of FIG. 2 communicates with multiple clients using OFDMA for sharing the bandwidth among users with full-duplex links over each OFDM tone and with support for multiple transmit and multiple receive antennas 110 (e.g. N×N). Though described as access points, the components 104 and 108 may be configured as base stations (BS) or other communication components such as relays, range extenders, wireless terminals, and wireless nodes involved in ad hoc or wireless mesh networks.

Figure 3:
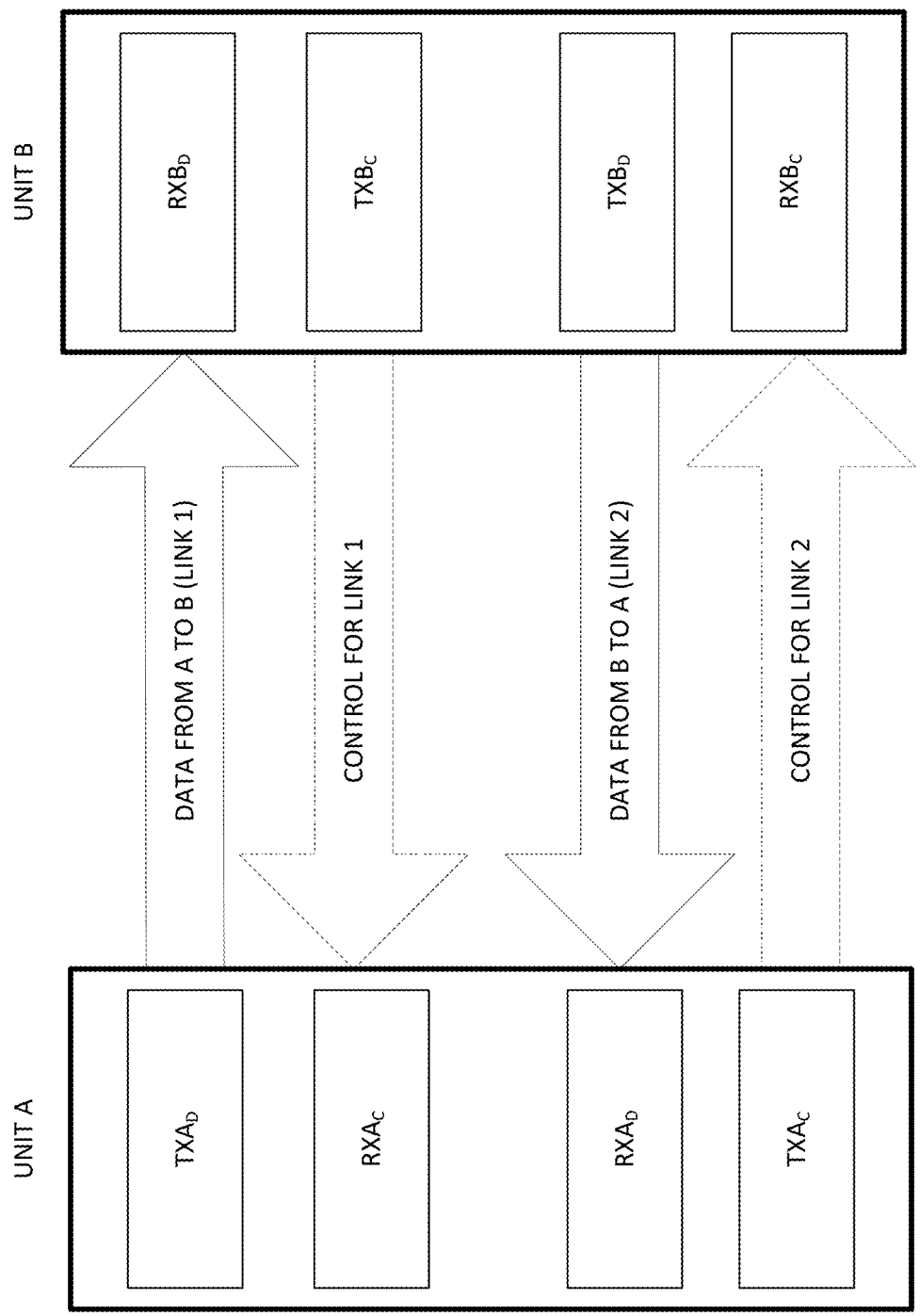
FIG. 3 is a channel diagram of full-duplex transceivers in accordance with some embodiments.

FIG. 3 is a block diagram showing the details of one embodiment of each of the communication links in FIGS. 1 and 2, including full-duplex flow for data and control where control communications may include one or more of reference for time/frequency/clock synchronization, channel gain/phase, channel matrix in MIMO, beam-forming vectors, beam-forming gains, Automatic Repeat request (ARQ), power control, instruction for adaptive coding and modulation, etc.

Figure 4:
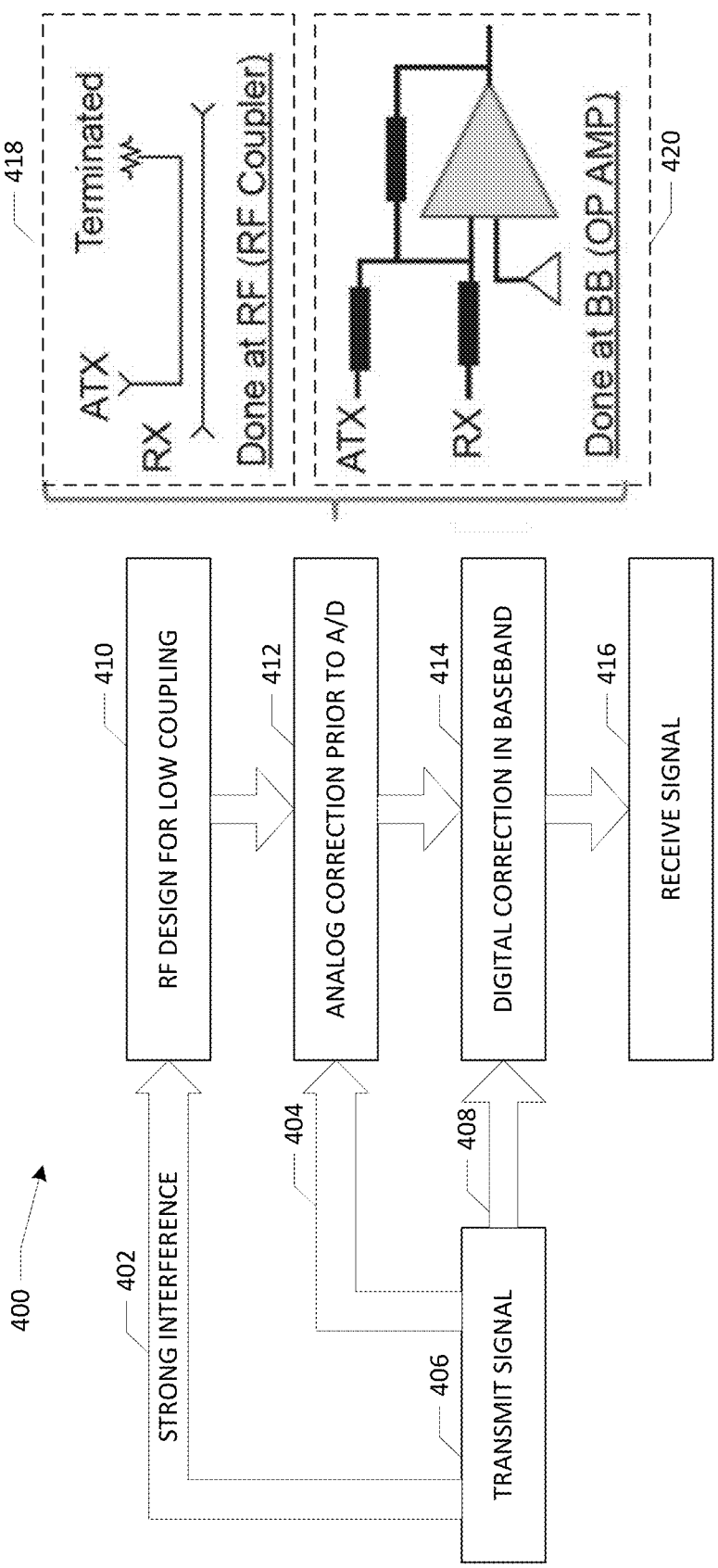
FIG. 4 is a block diagram of an interference cancellation signal flow.

As explained herein, several techniques in RF and baseband are provided to reduce/cancel the self-interference, as shown in FIG. 4. In a first aspect 410, antenna design is employed to reduce the incidence of self-interference 402 at a full-duplex communication node 400. Symmetrical (e.g., pair-wise, triple-wise) transmit and receive antennas are relatively positioned to reduce coupling between transmit and receive and thus reduce the incidence of self-interference. Thus, to facilitate full-duplex communications, access points and clients of the communication network are configured to reduce self-interference between a component's own respective antennas and transmit and receive chains. In the case of two-dimensional structures, it is shown that there exist pairs of symmetrical antennas with substantially zero mutual coupling over the entire frequency range. To simplify implementation and also provide support for MIMO in two dimensions, various embodiments include a second class of antenna pairs with low, but non-zero coupling. This is based on placing one set of antennas in the plane of symmetry of another set. In 3-dimensions, it is shown there exist triple-wise symmetrical antennas with zero coupling between any pair. It is also shown that in 3-dimensions, one can indeed find two sets of antennas (to be used for transmit and receive in a MIMO system) such that any antenna in one set is decoupled (zero coupling over the entire frequency range) from all the antennas in the second set. Furthermore, such three dimensional structures are generalized to the case that antenna arms are placed closely or merged, for example using two-sides or different layers of a PCB, or analogous approaches based on using Integrated Circuit (IC). An example for the implementation of such constructions is based on using patch antennas wherein one antenna arm is generated through reflection of the other antenna arm in the ground plane. Examples of such a construction are presented wherein the same patch is used as the transmit antenna, the receive antenna and the coupler necessary in analog cancellation. Examples are presented to generalize such constructions for MIMO transmission. Hereafter, such constructions are referred to as being in 2.5 dimensions, or simply 2.5 dimensional.

Most examples and aspects herein are described based on using separate antennas for transmit and receive. However, most of the techniques described for self-interference cancellation will be still applicable if the same antenna is used for transmit and receive. Known methods for isolating transmit and receive chains may be applied. To describe the systems and methods a basic setup is used herein. For this purpose, aspects relevant to issues like synchronization and equalization are described assuming OFDM, likewise aspects relevant to supporting multiple clients and networking are described assuming OFDMA. However, techniques herein will be applicable if OFDMA is replaced by some other known alternatives, e.g., CDMA, OFDM-CDMA, Direct Sequence (DS)-CDMA, Time-division Multiple Access (TDMA), constellation construction/transmission in time with pulse shaping and equalization, Space Division Multiple Access (SDMA), and their possible combinations.

In a second aspect 412, a corrective self-interference signal 404 is generated and injected into the receive signal at 412. Weighting coefficients for filtering are calculated for a primary transmit signal and an auxiliary transmit signal comprising the corrective self-interference signal 404. The corrective self-interference signal may be transmitted by the node to combine in the air with the signal to be received by the node's receive antenna. Transmission of the corrective self-interference signal can be at power levels comparable with the primary signal using an antenna with comparable functionality as the antenna used to transmit the primary signal. This can be the case if multiple high power transmit antennas are available in the unit. As an alternative, an auxiliary transmit antenna, with high coupling to the receive antenna, may be used to transmit the corrective self-interference signal with low power. The corrective self-interference signal may be coupled (e.g., in RF in the receive chain of the node without the use of an antenna) to the signal received by the receive antenna. In various embodiments, the analog cancellation may take place at an RF coupler 418, or alternatively it may take place at baseband frequencies using circuit 420.

As shown in FIG. 4, another technique for cancelling self-interference is to determine the response of a transmit-to-receive baseband channel, also referred to herein as a residual interference channel, or a residual self-interference baseband channel. The baseband version or frequency domain version of the transmit signal 408 may be provided to the receiver baseband processor 414 for digital correction by processing the transmit signal with the residual self-interference baseband response and then subtracting it from the incoming signal to obtain the received signal 416.

Figure 5:
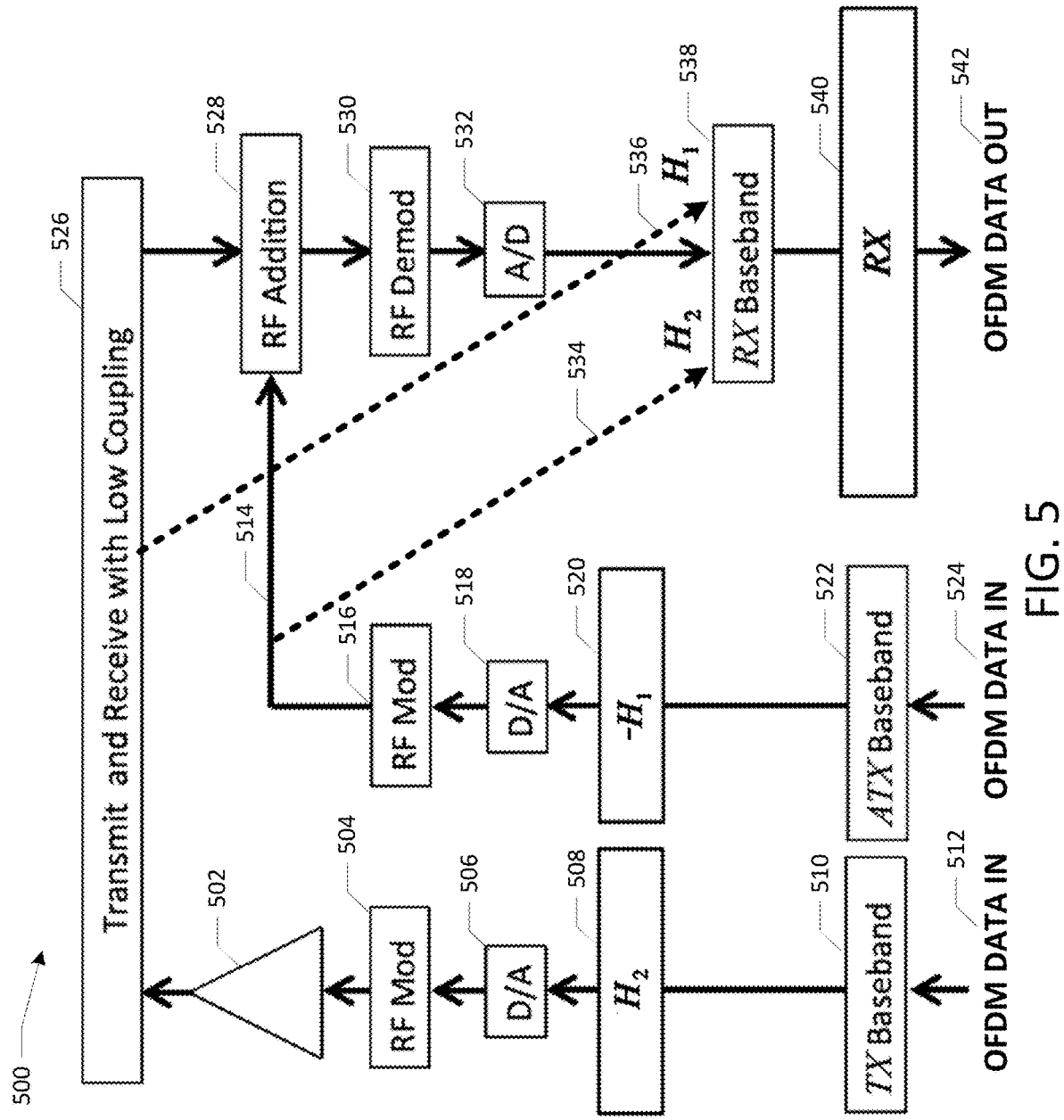
FIG. 5 is a block diagram of a self-cancellation full-duplex transceiver.

With respect to FIG. 5, one embodiment of a full-duplex transceiver is shown. OSDN data 512 is provided to the transmitter baseband processor 510. This signal will form the basis of the primary transmit signal 526 that is propagated between the transmit antenna and receive antenna with low coupling as described herein. The baseband processor 510 generates OFDM symbols for transmission and passes them to preprocessor unit 508. Preprocessor unit 508 multiplies the OFDM symbols by the transfer function $H_2$, which represents the transmission channel of the auxiliary transmit path 534. The signal is then converted to a time domain signal and passed through digital to analog converter 506. Alternatively, transmit baseband processor 510 generates the time domain signal with an IFFT module and preprocessing filter 508 is implemented in the time domain, such as by an FIR filter. The output of preprocessing unit 508 is converted to an RF signal by modulator 504, and amplified by power amplifier 502, and finally transmitted to a distant end receiver (not shown).

In the auxiliary transmit channel the OFDM data 524 is provided to the auxiliary transmit baseband processor 522.

Similar to the primary transmit chain, the auxiliary preprocessor 520 may alter the OFDM symbols by the transfer function ($-H_1$), which is the negative of the channel response of the interference channel 536. Alternatively, the output of the auxiliary transmit baseband processor 522 may be time domain signals calculated by an IFFT module, and the preprocessor unit 520 may be an FIR filter to process signals in the time domain. The output of preprocessor 520 is provided to a digital to analog converter 518, and then to RF modulator 516, to generate the auxiliary transmit signal 514, also referred to as the self-interference cancellation signal. The self-interfering signal 526 combines with the self-interference cancellation signal 514 by way of RF addition 528.

In the embodiment of FIG. 5, the self interference is cancelled by determining the characteristics, or frequency response, of (i) the self-interference channel $H_1$ caused by the primary transmit signal as coupled through the primary transmit antenna and the receive antenna, and (ii) the self-interference cancellation channel $H_2$ caused by the auxiliary transmit path, which conveys the self interference cancellation signal. The channel responses may be determined by channel sounding techniques, including transmitting predetermined tones and measuring the magnitude and phase variations of the tones in the received signal. Note that the channel responses $H_1$ and $H_2$ are the responses of the complete channel from the OFDM data at the respective transmitters through their respective chains, through the analog signal propagation/RF channels, the receiver analog front end, all the way to the receiver baseband 538. The cancellation effect in the embodiment of FIG. 5 is due to the concatenation of the two channel responses in the primary transmit chain ($H_2$ from preprocessor 508, and $H_1$ from the remainder of the transmission path), and the negative of the concatenation of the two channel responses in the auxiliary transmit chain ($-H_1$ by preprocessor 520, and $H_2$ from the remainder of the auxiliary transmission path). Because of these two concatenations performed by the respective transmission/reception chains, the self-interference signal 526 is substantially reduced by the negative contribution of the self-interference cancellation signal 514, by way of RF addition 528. The remaining received signal is then demodulated by RF demodulator 530, and is sampled by analog-to-digital converter 532. The sampled signal is then processed by receive baseband processor 538/540. Receive baseband processor 538/540 performs an FFT to generate the OFDM symbols 542. Note that both preprocessors 602, 604 may apply the channel responses by operating directly on the OFDM transmit signals by altering the magnitude and phase of the symbols according to the channel response. Alternatively, the preprocessing may be performed in the time domain.

Figure 6:
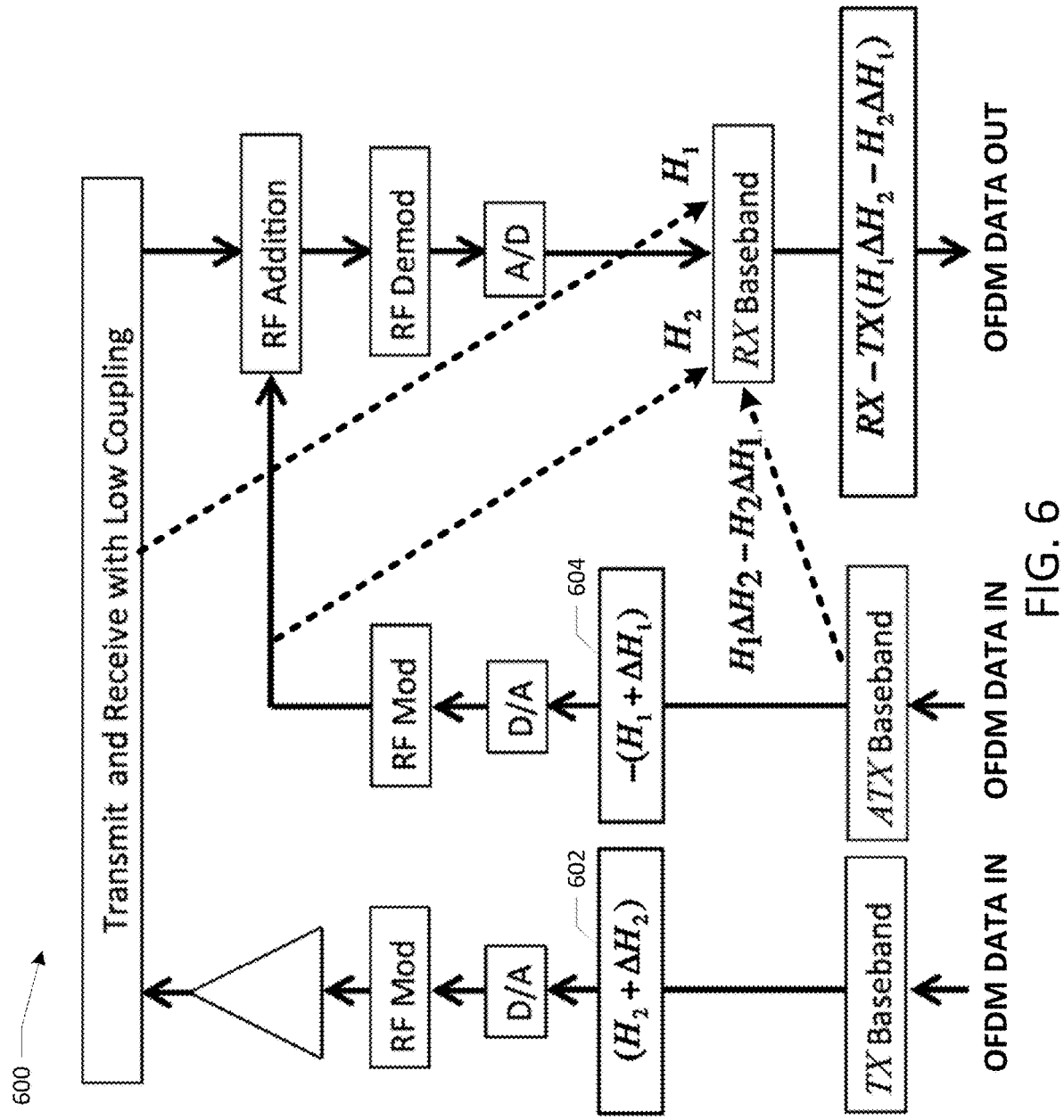
FIG. 6 is a block diagram of another embodiment of a self-cancellation full-duplex transceiver.

In a further embodiment of full-duplex transceiver 600 depicted in FIG. 6, it is recognized that the self-interference channel $H_1$ and the self-interference cancellation channel $H_2$ as determined by the full-duplex transceiver 600 are only estimates of the actual channel responses and may include errors $\Delta H_1$ and $\Delta H_2$, respectively, as shown in preprocessing units 602, 604. After the concatenations of the primary transmit signal and the auxiliary transmit signal with their counter channel responses, a residual interference signal remains after the RF addition. This residual signal is separately measured at the receiver baseband processor, as described more fully below, and is referred to herein as the residual self-interference baseband channel response. Note that both preprocessors may apply the channel responses by operating directly on the OFDM transmit signals by altering the magnitude and phase of the symbols according to the channel response. Alternatively, the preprocessing may be performed in the time domain.

Figure 7:
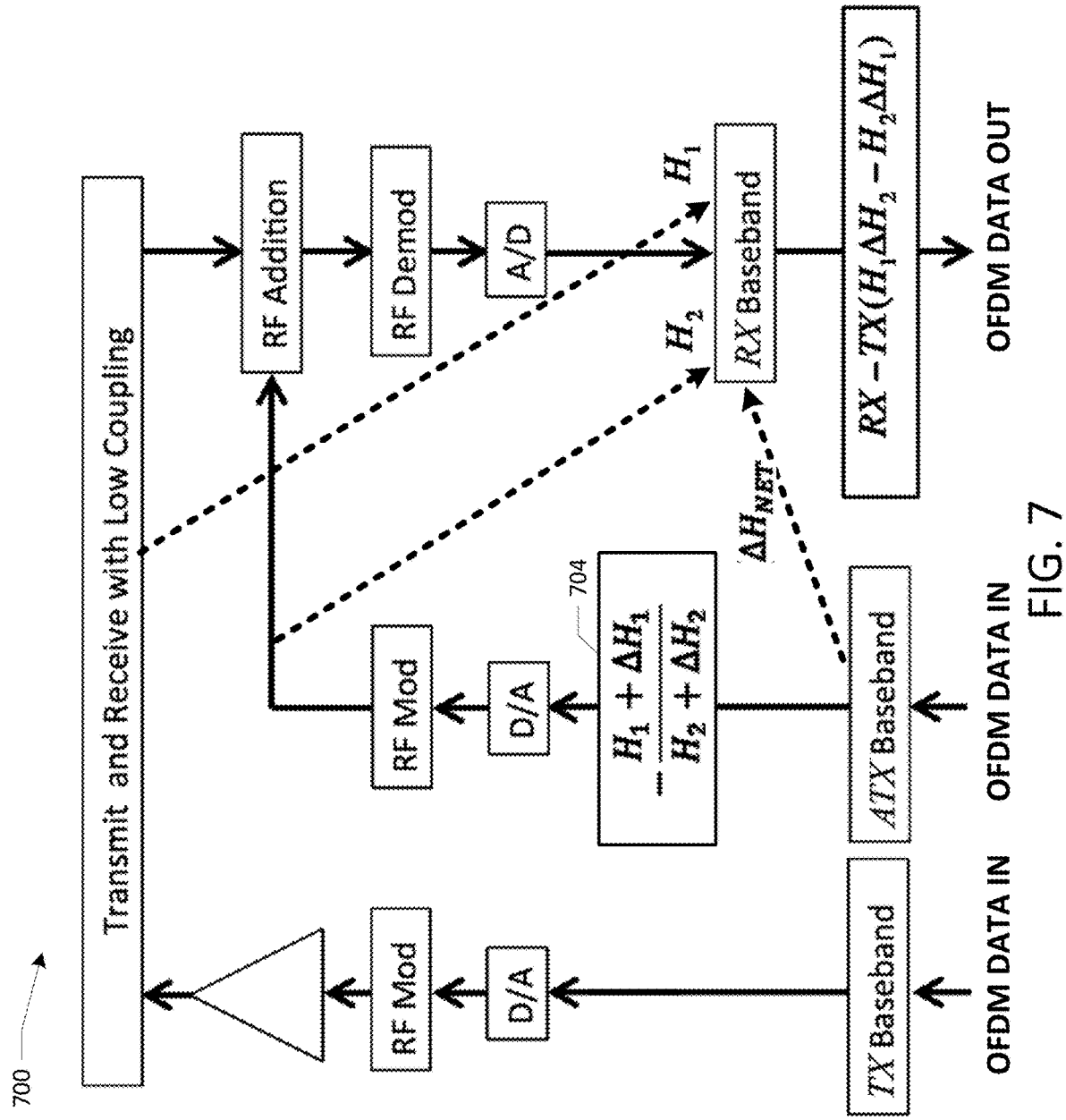
FIG. 7 is a block diagram of another embodiment of a self-cancellation full-duplex transceiver.

FIG. 7 depicts an alternative embodiment 700 of preprocessing the auxiliary transmit signal. In this embodiment, only the auxiliary transmit signal is preprocessed by preprocessor 704. The filter response used by preprocessor 704 is the negative ratio of the channel estimate ($H_1+\Delta H_1$) for the primary self-interference channel $H_1$ to the channel estimate ($H_2+\Delta H_2$) for the self-interference cancellation channel response $H_2$. After the combination of the self-interference signal from the primary transmit chain is combined with the preprocessed auxiliary transmit signal that traverses $H_2$, a residual interference signal remains after the RF addition. This residual signal is separately measured at the receiver baseband processor, as described more fully below, and is referred to herein as the residual self-interference baseband channel response.

FIGS. 8 to 11 show block diagrams representing transmit and receive chains, in accordance with examples of embodiments of the full-duplex transceivers shown FIGS. 1 and 2. These embodiments differ in the method used to construct the axillary corrective signal from the main transmit signal and the method used to couple (add) the corrective signal with the incoming signal. In some embodiments, the cancellation in analog domain due to the corrective signal is performed prior to Low-Noise-Amplifier (LNA). In another embodiment, this is done after the LNA, and before the A/D. In some embodiments, the filtering is performed in time domain. In another embodiment, filtering is performed in the frequency domain. In some embodiments compensation for amplifier nonlinearities is explicitly shown. In other embodiments compensation for amplifier nonlinearities is implicit.

The construction of a secondary (corrective) signal uses the data from the primary transmit signal and an instantaneous measurement of the self-interference channel. The corrective signal, or self-interference cancellation signal, is subtracted (in the analog domain) from the incoming signal prior to A/D. This can be achieved by using multiple, in particular two, transmit antennas with proper beam-forming weights such that their signals are subtracted in the air at the receive antenna. The antenna used to transmit the corrective signal can be a fully functional transmit antenna (similar to the other antenna used in the transmission) in the sense that it is connected to a power amplifier and has a low coupling with the corresponding receive antenna. This scenario may be of interest if there are several transmit units available which can be used in different roles depending on the mode of operation. An alternative is to use an antenna that is designed exclusively for the purpose of self-interference cancellation and consequently has a high coupling to the receive antenna and can transmit with a low power.

A different approach is based on subtracting such a corrective signal in the receive chain prior to A/D using methods for RF signal coupling. Regardless of which of the above methods for active cancelation are used, the corresponding weights may be referred to as the self-cancellation beam-forming coefficients. To improve mathematical precision by avoiding dividing of numbers, it helps if the weighing is applied to both primary and secondary signals as shown in FIG. 6 (as opposed to that of FIG. 7), while scaling both to adjust transmit energy. However, an equivalent filtering operation can be applied to only one chain, in particular to the auxiliary corrective signal. Aspects of filtering for construction of the auxiliary corrective signal are mainly explained using frequency domain realization, however, filtering can be also performed in the time domain.

In particular, it is preferred that channel impulse responses are measured in the frequency domain, and then converted to a time-domain impulse response or difference equation used to implement the filter in the time domain. Time domain filters may act continually on the signal in the time domain, or account for and compensate for the initial condition due to the filter memory from the previous OFDM symbol.

FIGS. 8 to 11 depict various embodiments of analog cancellation through the use of a Secondary (Corrective) Transmit Signal, or a self-interference cancellation signal. That is, after the antenna stage that may be used to reduce the magnitude of the cross-coupling between the primary transmit stage and the receiver chain, self-interference can be further reduced in RF by forming an auxiliary (corrective) signal to cancel the effect of the self interference and subtract it from the incoming signal prior to A/D. This operation is hereafter called "signal injection", or "corrective beam-forming". Although the discussion is focused on injecting the corrective signal in RF and in particularly prior to A/D, this operation can be also done at IF, or even at the base-band.

Injection of corrective signal can be also achieved by connecting it to a separate transmit antenna such that the subtraction is performed in the air. This alternative can be an attractive option for cases where the unit has several transmit antennas and several modes of operation, for example a high throughput mode in which the transmit antennas send independent data, and a full-duplex mode in which some of the transmit antennas are used to cancel the self-interference. In this case, multiple transmit antennas create a null on the receive antenna(s) relying on beam-forming within the same unit. Note that restriction on antenna spacing will be less than the case of ordinary MIMO as null creation is easier to achieve compared to the independent gain requirement in MIMO. In the case of having several receive antennas, multiple such corrective transmit antennas can be used to create null on all receive antennas. Hereafter, this technique may be referred to as "corrective beam-forming".

Figure 8:
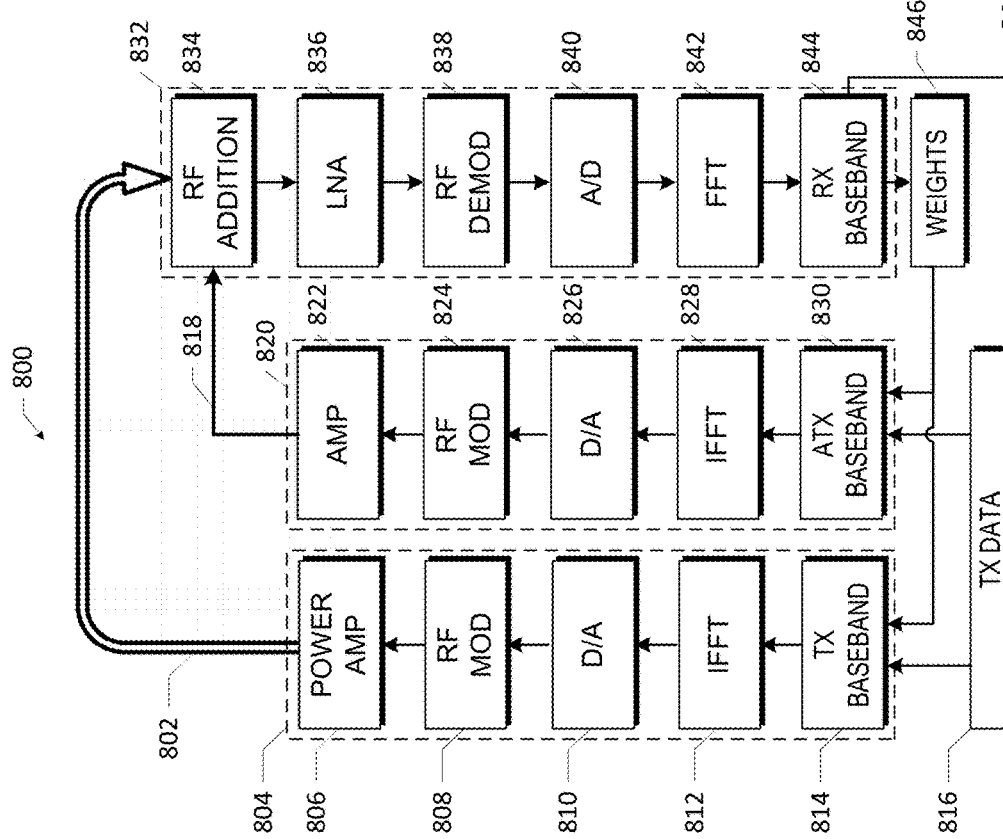

FIG. 8 shows one embodiment of a full-duplex transceiver 800. The transmit data 816 is provided to transmit baseband 814 of primary transmit chain 804, which formulates OFDM symbols and forwards them to IFFT processing unit 812 for conversion to a time domain signal. The data is then converted to an analog signal by digital to analog converter 810. The analog signal is then modulated by RF modulator 808, and amplified by power amplifier 806. The signal is then transmitted to a distant end receiver (not shown), and the transmission causes a self interfering signal 802 to be received by the receive chain 832. The transmit data 816 is also provided to auxiliary transmitter 820, where the baseband processor 830 generates OFDM symbols. The OFDM symbols are converted to a time domain signal by IFFT processor 828, and then converted to a time domain signal by digital to analog converter 826. The auxiliary transmit signal is then modulated by RF modulator 824, and amplified by amplifier 822 for transmission to the receiver chain 832 via path 818.

Note that the preprocessing of the primary transmit signal and the auxiliary transmit signal may be performed by transmit baseband processor 814 and auxiliary transmit baseband processor 830, respectively. Specifically, the TX base-band component 814 and ATX base-band component 830 receive weights from weights calculation unit 846 to perform the corrective beam forming (when transmitted for combining in the air) or signal injection (i.e. when added in RF on the unit 800). The various embodiments of the coupling between the primary transmit chain 804 and the receiver chain 832, as well as the coupling between auxiliary transmit chain 820 and the receiver chain 832 will be described more fully below with respect to FIGS. 12, 13, and 15-41.

In the embodiment 800 illustrated, the amplified signal from amplifier 804 is transmitted, via a pair-wise symmetrical transmit antenna whereas the amplified signal from amplifier 820 is output for combining with a received signal from a pair-wise symmetrical receive antenna of receiver 832 via RF coupling unit 834. A low noise amplifier 836 amplifies the combined received and injected signal. The amplified signal is demodulated (by demodulator 838) and analog to digital conversion is performed at A/D Unit 840. The digital signal is passed to FFT unit 842 and thereafter to RX base-band 844, which provides received data 848 and information (measurements) to weights calculation unit 846.

Figure 9:
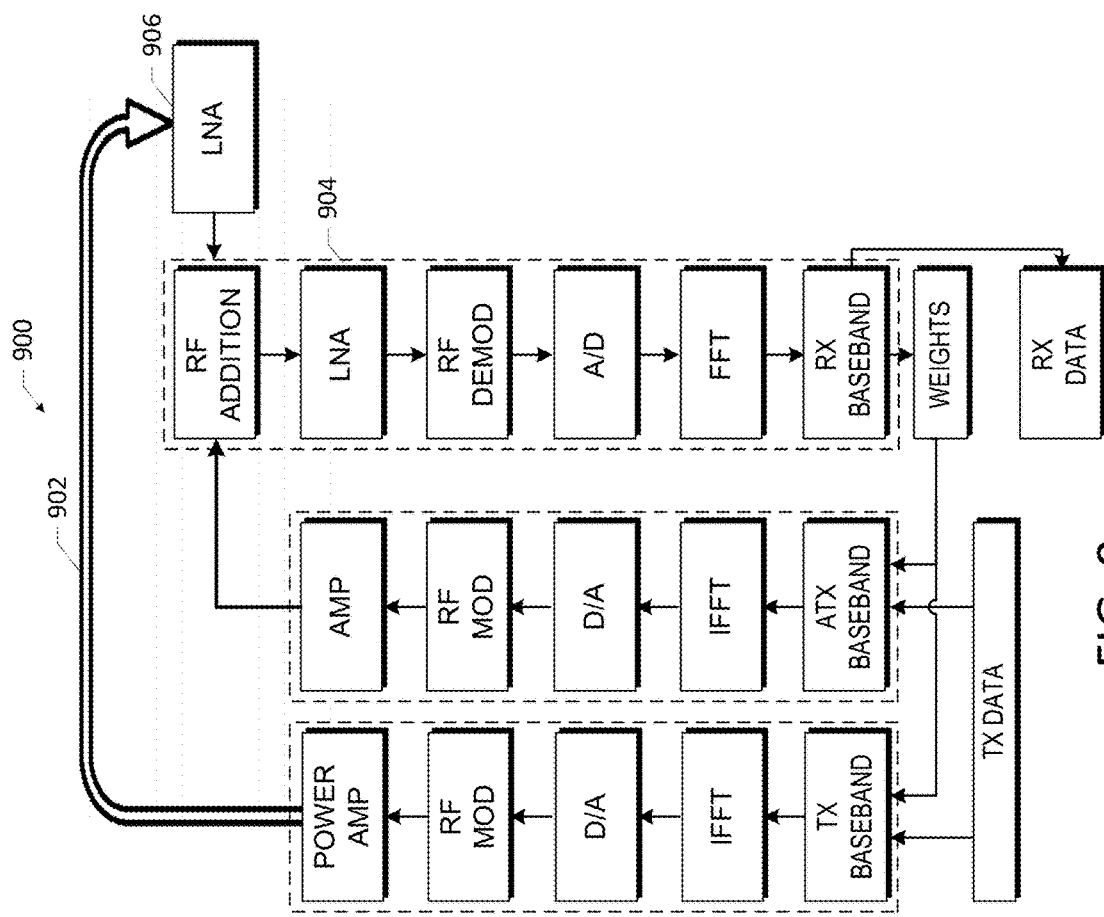
FIGS. 8-11 are block diagrams of various embodiments of full-duplex transceiver signal processing elements.

FIG. 9 depicts an embodiment where the received signal and the self-interfering signal are first amplified by LNA 906 before being combined with the self-interference cancellation signal from the auxiliary transmitter chain. In a further alternative embodiment, the LNA 904 may be omitted.

Figure 10:
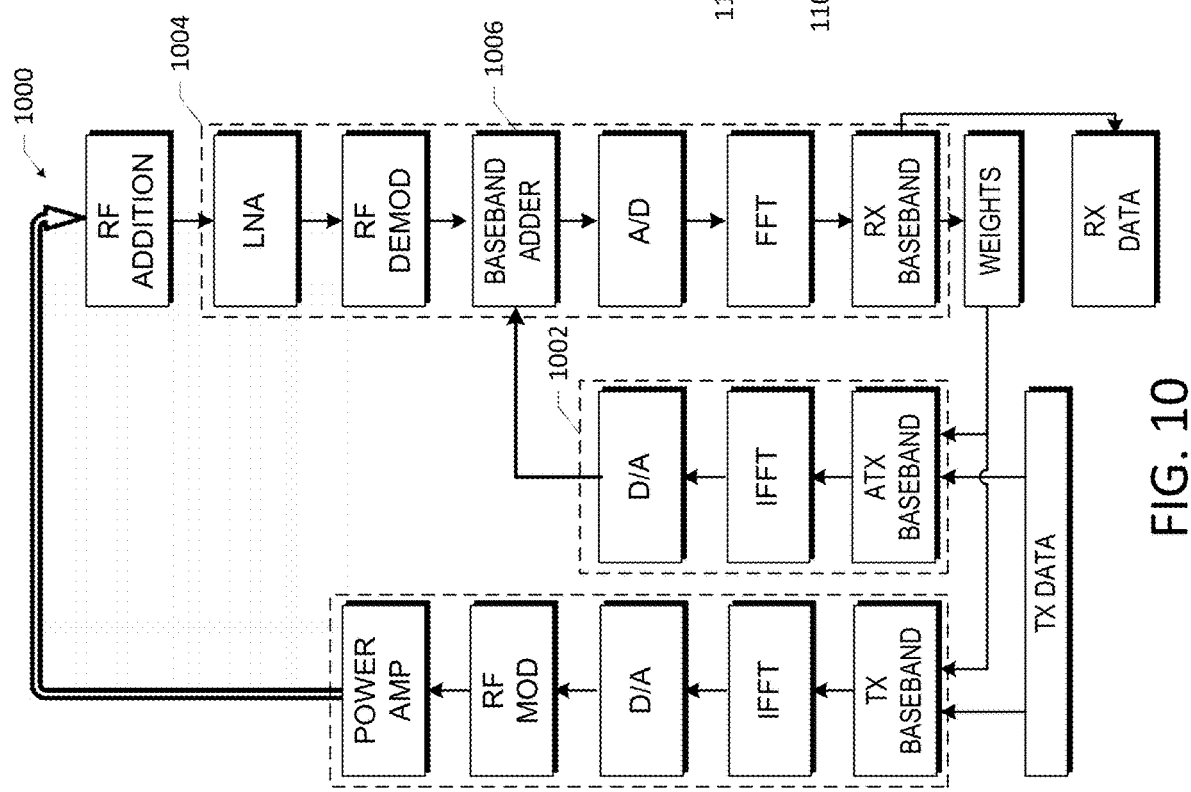

FIG. 10 depicts an embodiment 1000 where the auxiliary chain 1002 generates a self-interference cancellation signal in the form of an analog baseband signal, which is added in the received chain 1004 by baseband adder 1006.

Figure 11:
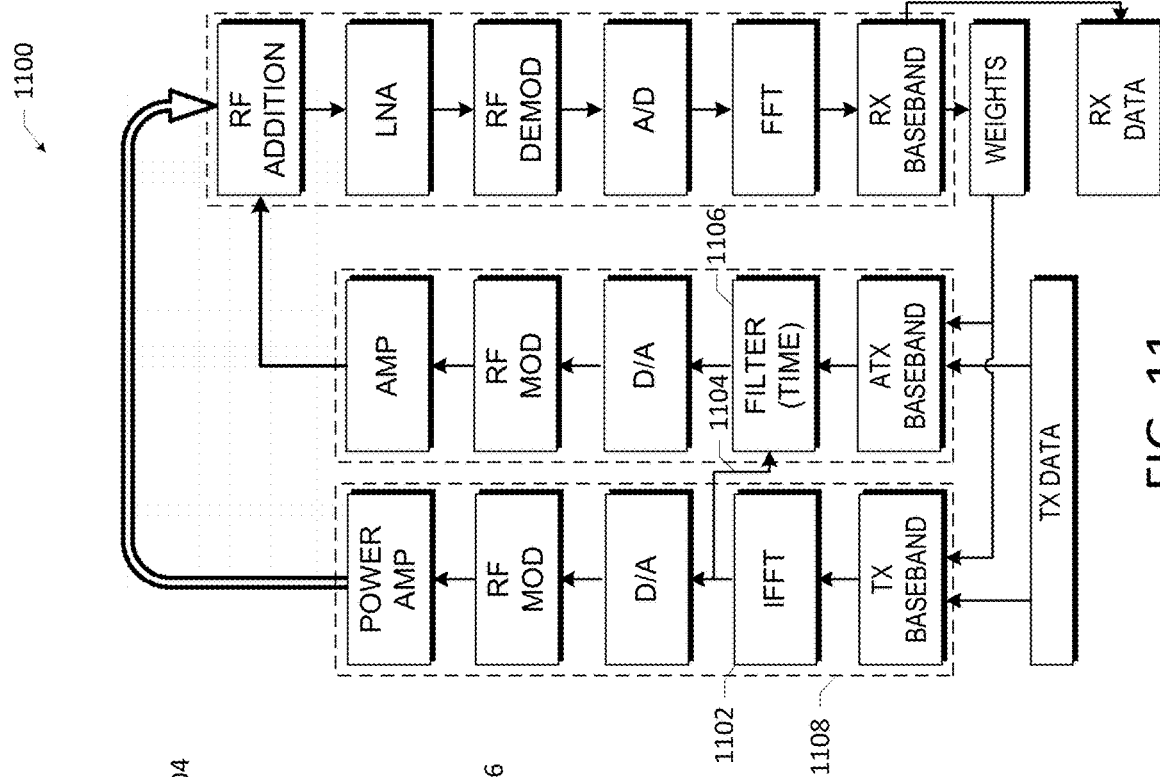

FIG. 11 depicts an embodiment 1100 wherein the time domain signal from IFFT 1102 is provided to the auxiliary chain for filtering as shown by signal line 1104 for processing by discrete time domain preprocessing digital filter 1106. Filtering in time can be used to reduce the number of IFFT operations, and also to improve the performance of self-interference cancellation during OFDM cyclic prefix. Filter coefficients can be still computed using frequency domain training. Note that preprocessing filter 1106 can implement the filter of preprocessor 704. In a further alternative embodiment, an additional time domain filter may be included in primary transmit chain 1108 to implement preprocessor filter 602, while preprocessing filter 1106 would be configured to implement preprocessing filter 604 in the time domain.

Figure 12:
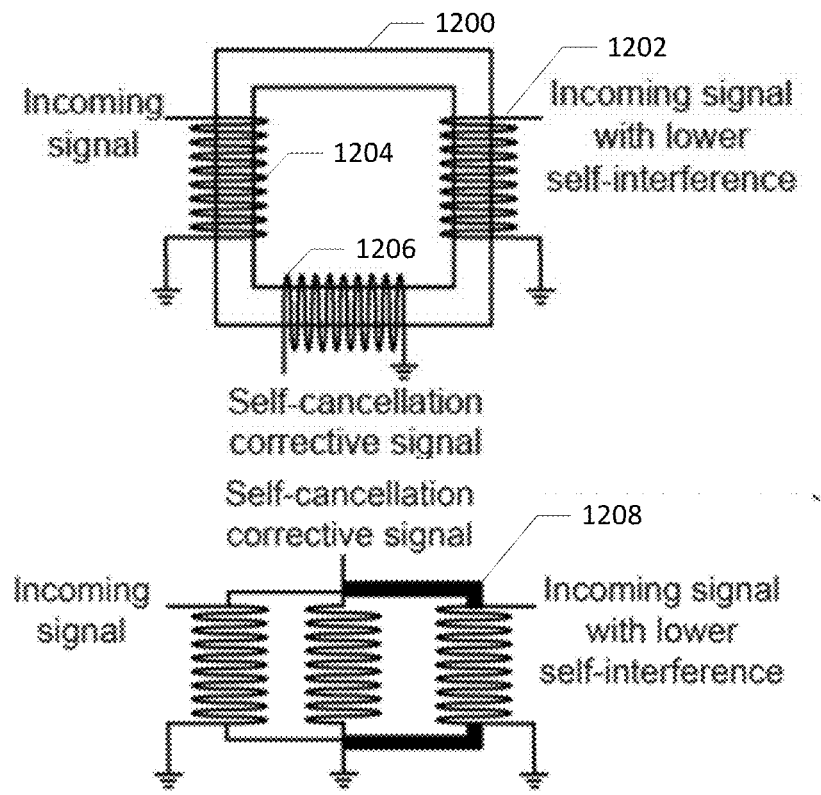
FIG. 12 is a circuit for directly coupling the self-interference cancellation signal.

FIG. 12 shows a schematic view of one embodiment of how the self-cancelling signal may be injected in the receive chain and coupled to the received signal to cancel the self-interference. The coils 1204 and 1206 around the core 1200 provide the incoming signal and the self-interference cancellation signals, respectively, while the incoming signal with reduce self-interference is provided on output coil 1202. Thus, FIG. 12 shows the self-interference cancelling signal being injected to the receive chain through a coupler (instead of being transmitted in the air using an additional transmit antenna) to cancel the self-interference.

Configuration 1208 of FIG. 12 shows that the relative width of the transformer arms and/or number of turns can provide a static relative weighting for the injected self-cancelling signal to increase coupling, in accordance with one example embodiment. In particular, the three signals are shown as being coupled with one side of each of the coils connected to ground. However, in practice, the inputs could be balanced or unbalanced. These are representative pictorial views of sample methods for combining RF signals. The transformer here is just a pictorial view of RF signal coupling and can be realized in various ways known for RF coupling. Generalization to MIMO will be clear to those skilled in the area. Having high coupling for the corrective signal reduces the need for amplification in the corrective chain and consequently helps to maintain linearity in the corrective signal chain. It also helps to avoid deterioration of the received signal to noise ratio, which can be a side effect of signal coupling.

Figure 13:
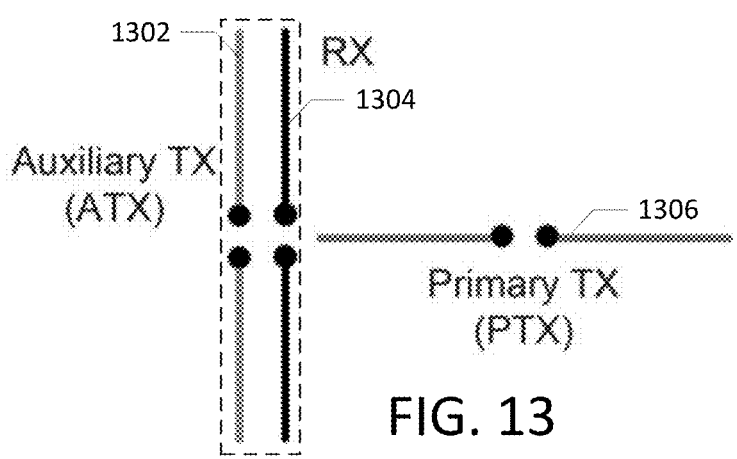
FIG. 13 is an antenna configuration for with high coupling of the self-interference cancellation signal.

FIG. 13 shows a schematic view of another embodiments where the self-cancelling signal is coupled to the received signal with a high coupling to avoid the need for excessive gain in the auxiliary chain and thereby maintaining linearity in the auxiliary chain (corrective signal). In particular, FIG. 13 shows the use of two transmit (one high power horizontal 1306 and one low power vertical 1302) antennas and one receive (vertical 1304) antenna where beam-forming at the two transmit antennas 1302, 1306 can be used to cancel the self-interference at the receive antenna 1304. Auxiliary Transmit Antenna has a simple structure, transmits with low power and has a small spacing to RX antenna (high coupling with RX antenna). More generally, the dashed box in FIG. 13 symbolizes a multi-terminal antenna. Auxiliary Transmit Antenna 1302 can also be one of the antennas used in MIMO mode (as TX or TX/RX with duplexer), which is switched to act as Auxiliary Transmit Antenna, when needed. Multiple Auxiliary Transmit Antennas can be used for MIMO to cancel multiple self-interference terms.

Figure 14:
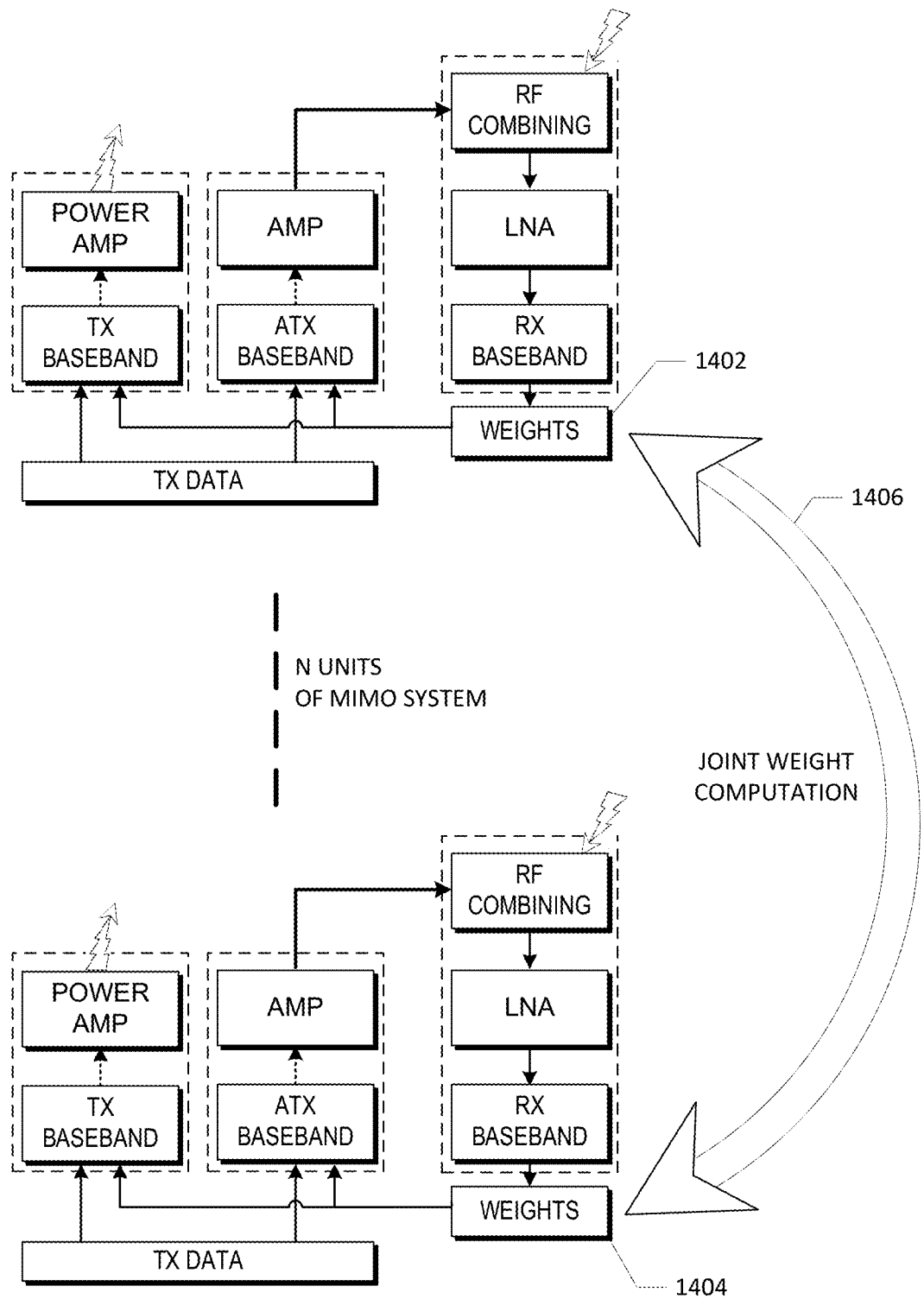
FIG. 14 is a MIMO system that computes joint weight values.
Figure 15:
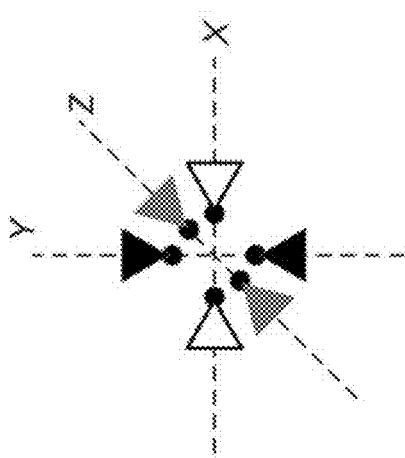
FIGS. 15-18 show pictorial views of pair-wise symmetrical antennas.

In the case of MIMO embodiments, each receive chain has its own corrective, or self-interference cancellation signal. Assuming M transmit antennas, each such corrective signal is computed by forming a linear combination of the M transmit signals based on measuring the corresponding channel gains. The corrective signal is still transmitted from a single highly coupled ATX feed, such as through a power coupler. FIG. 14 shows a MIMO-based configuration with N radio units. For simplicity, some of the components of transmitters and receivers are omitted and represented by a dash dot line. Weights calculation units 1402 and 1404 jointly compute the weights as indicated by arrow 1406. Each corrective signal is computed by forming a linear combination of the M transmit signals based on measuring the corresponding channel gains.

An antenna configuration is referred to herein as self-symmetrical when its two arms are the image of each other with respect to a plane of symmetry (construction & excitation). Two antennas are referred to herein as pair-wise symmetrical when the following conditions are satisfied: (i) each antenna is self-symmetrical, (ii) the two antennas have different planes of symmetry, and (iii) Each antenna configuration is invariant under reflection in the plane of symmetry of the other one.

Figure 17:
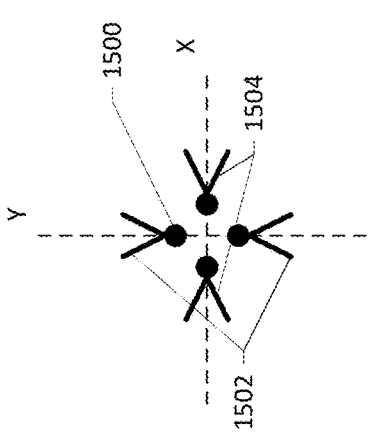
Figure 18:
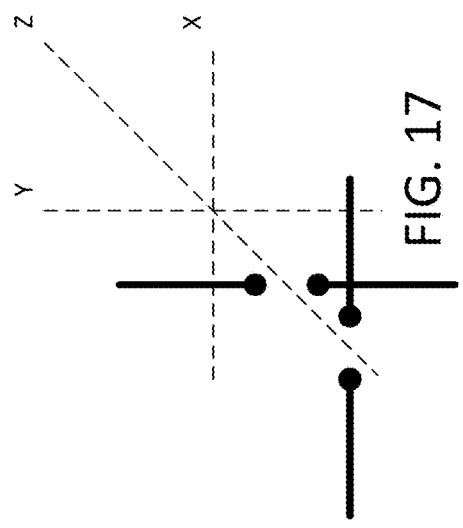

FIGS. 15-18 show pictorial views of pair-wise symmetrical antennas for components in accordance with examples. The plane of symmetry for the vertical antenna 1502 is the plane passing through the x axis, and the plane of symmetry for the horizontal antenna 1504 passes through the y axis. Note that the dots such as dot 1500 indicate terminals, and that radiating elements 1502 and 1504 are "V" shaped to illustrate the use of physical symmetry, and are not intended to represent actual radiating element geometries. FIG. 17 shows a 3-dimensional arrangement where the horizontal antenna has its terminals in the XZ plane near the Z axis, with its plane of symmetry being the YZ plane. The vertical antenna has its terminals in the YZ plane, also close to the Z axis but closer to the origin, where the XZ plane is the plane of symmetry. FIG. 18 shows antenna 1802 is a ring (in the XY plane).

Figure 19:
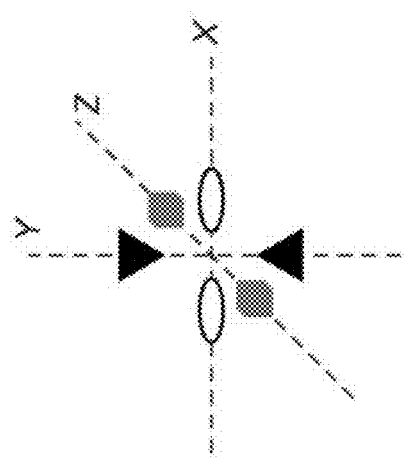
FIGS. 19-20 show a pictorial view of triple-wise symmetrical antenna structures.
Figure 16:
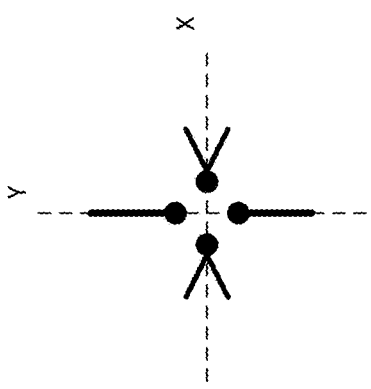
Figure 20:
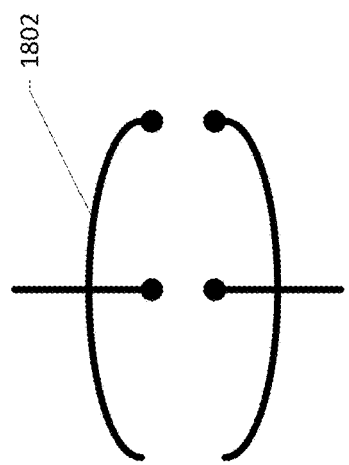

The above idea can be generalized to obtain triple-wise symmetrical antennas in 3-dimensional space (e.g. see FIGS. 19 and 20). In this case, each two antennas are pair-wise symmetrical, meaning there is theoretically zero coupling between any pair. For such a configuration, the 3×3 S-matrix is diagonal in theory, or close to diagonal in practice, independent of frequency.

Figure 23:
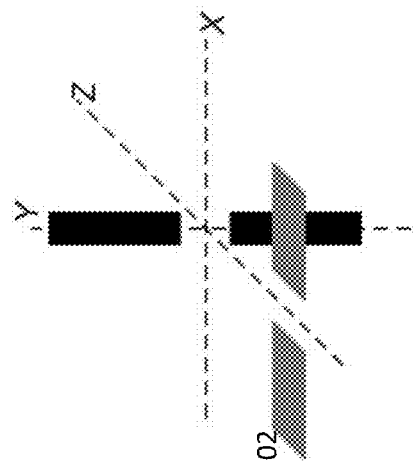
FIGS. 21-23 show examples of MIMO antenna structures in 3-dimensional space.
Figure 22:
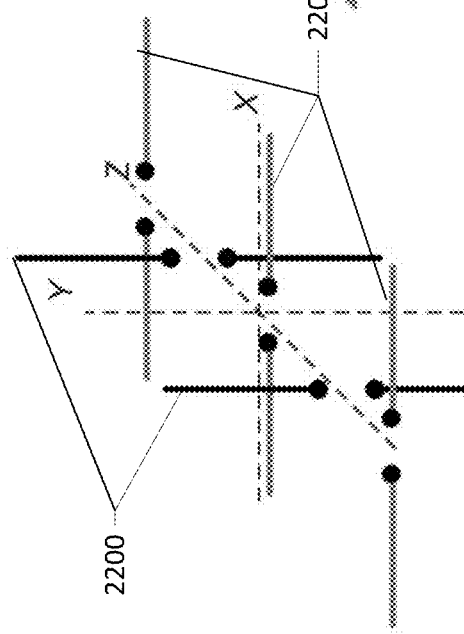
Figure 21:
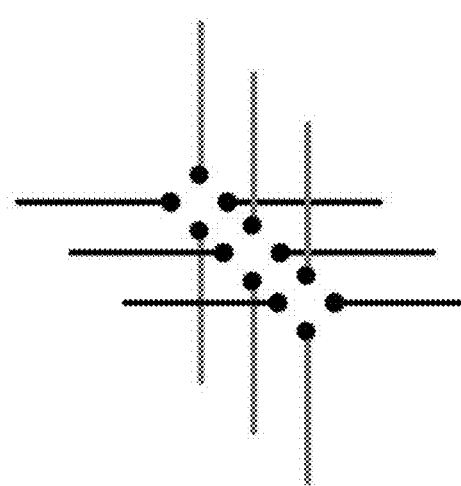

FIGS. 21-23 show examples of MIMO antenna structures in 3-dimensional space where every antenna in one subset, is decoupled from all the antennas in the second subset, using pairwise symmetry. FIG. 21 utilizes the third dimension to stack the parallel and horizontal antennas along the Z axis, while FIG. 22 staggers each of the horizontal antennas 2202 and the vertical antennas 2200 along the Z axis. Multiple-Input Multiple-Output Antenna systems are based on using multiple antennas at each node and exploit the resulting spatial degrees of freedom to increase the rate and/or increase the diversity order. For a MIMO full-duplex radio, there is a set of TX antennas and a set of RX antennas (See FIG. 2). To satisfy the low coupling requirement, each antenna in TX set may be pair-wise symmetrical with respect to all antennas in RX set and vice versa. To do so, a straightforward approach is to use the symmetry planes of TX and RX antennas to generate more elements in each set, but this configuration results in unwanted distance between antenna arms and thereby affects their radiation efficiency. To improve radiation efficiency in such a configuration, antenna arms can be brought closer by placing antennas on different PCB layers or its equivalent in other forms of realizing antennas in integrated circuit, or multi-layer antennas with layers coupled through air or through other materials with desirable electromagnetic property that can guide or block the wave.

On the other hand, MIMO implementation in three dimensions is more flexible (easier to implement). This is due to the observation that a pair-wise symmetrical antenna structure requires two dimensions effectively, and as a result, it is possible to generate more transmit/receive antennas satisfying the required symmetry condition along the third dimension. In such configurations, it is possible to change the order of antennas, and antennas can be of different lengths for multi-band operation. Some example configurations are shown in FIGS. 21, 23, and 23 of MIMO antenna structures in 3-dimensional space where every antenna in one subset is decoupled from all the antennas in the second subset. Methods structures to realize 3-dimensional antennas with pair-wise symmetry by using 2.5 dimensions may be used, e.g., using opposite sides or different layers of a PCB based on patch antenna structures. Some example configurations are shown in FIGS. 30-38. Constructions based on 2.5 dimensions may be used in forming MIMO antenna structures as shown in FIGS. 32-38.

Figure 24:
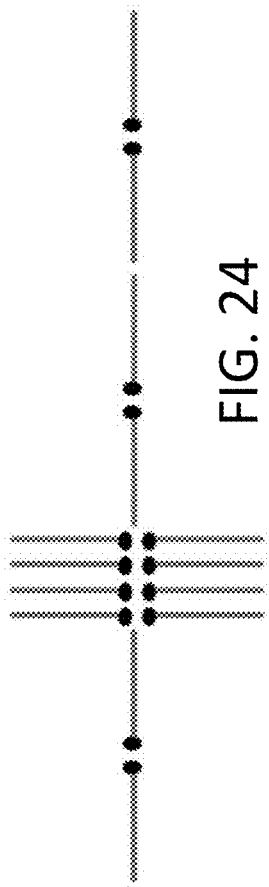
FIG. 24 shows examples for the placement of one antenna set in the plane of symmetry of some other antenna(s) to support MIMO in 2-dimensions.

It remains to find a better solution for implementation of MIMO in two dimensions. Since E-field of a self-symmetrical antenna is orthogonal to its plane of symmetry bisecting its feed terminals, a MIMO full-duplex radio with low (but non-zero) coupling can be realized in two dimensions by placing one set of antennas along the plane of symmetry of the other set. See FIG. 24 showing a 4×3 arrangement in two dimensions. In this configuration, shape of arms and spacing between antennas can be adjusted to compensate for lack of perfect symmetry, non-zero width of antennas, as well as for MIMO requirements (independence of gains). See FIGS. 28 and 29 showing numerical results (2.4 Ghz band using HFSS) for modifying the shape of the antenna to compensate for the loss in symmetry.

Although the methods of this disclosure are primarily explained in terms of Diploe and Patch antennas, generalization to other forms such as Monopole, Folded Dipole, Loop antennas (implemented using wire, PCB, or Integrated Circuit); Microstrip antennas, Reflector Antennas, e.g. Corner Reflector, Dish Antenna; Travelling Wave Antennas, e.g., Helical Antennas, Yagi-Uda Antennas, Spiral Antennas; Aperture Antennas, e.g., Slot Antenna, Slotted Waveguide Antenna, Horn Antenna; and Near Filed Communication Antennas should be clear to individuals skilled in the art.

FIG. 24 shows examples for the placement of one antenna set in the plane of symmetry of some other antenna(s) to support MIMO in 2-dimensional antenna structures in accordance with one example. While the configuration does not contain pairwise symmetry, the four verticals are symmetrical and their associated electric field is orthogonal to plane of symmetry, and the horizontal antennas are in that plane of symmetry, thereby reducing the coupling because the E-field is orthogonal. This configuration of FIG. 24 may be used for MIMO.

FIGS. 25-27 show examples of some antenna structures showing that the coupling between antennas can be very strong (−2 dB) due to near field signals unless it is cancelled relying on pair-wise symmetry where values of RF coupling are obtained using high frequency structural simulator (HFSS) at 2.4 Ghz band.

FIGS. 28 and 29 show numerical results (2.4 Ghz band using HFSS) for one example of modifying the shape of the antenna to compensate for the loss in symmetry. This demonstrates that the shape of the radiating elements may be adjusted so as to reduce the coupling.

FIGS. 30 and 31 show a schematic view of two pair-wise symmetrical antennas composed of a dipole and a patch antenna which has an arm above ground plane; and wherein diploe can be realized on the middle layer of a PCB sandwiched between the top and bottom surfaces forming the patch and the ground plane. That is, FIG. 30 shows a 3 dimensional, or 3D structure (also referred to as 2.5D), the radiating elements 3002 are located on either side of a printed circuit board, while elements 3004 are formed in the center of the PCB. This arrangement maintains pairwise symmetry.

FIGS. 32 and 33 show a schematic view of two symmetrical antennas which have shared arm above ground plane (patch antenna), one antenna has symmetrical feed with 180 degree phase shift, with the other antenna placed in its plane of symmetry, and wherein the shared arm is possibly shaped by removing its corners to reduce the coupling.

FIGS. 34, 35, 36, 37, and 38 show five configurations wherein antennas have a shared arm above ground plane (e.g., patch antenna) and tasks of transmit, receive and signal injection (corrective beam-forming) are combined into a single arm.

Figure 39:
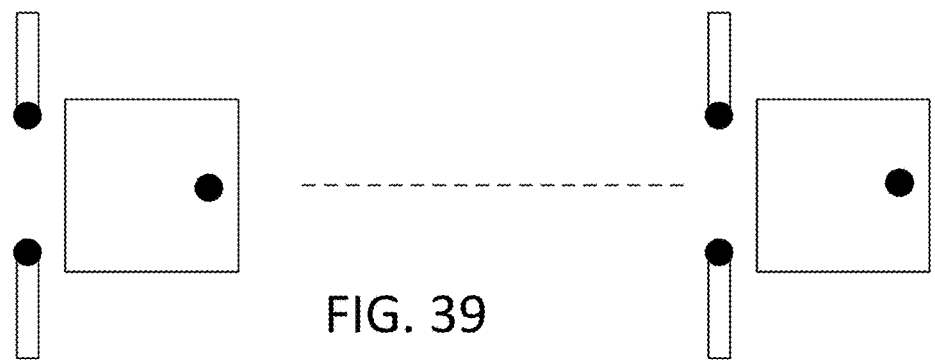
FIG. 39 shows a schematic view of a MIMO full-duplex node based on a generalization of antenna structure in FIG. 31.

FIG. 39 shows a schematic view of a MIMO full-duplex node based on a generalization of antenna structure in FIG. 31 to MIMO and by placing one set of antennas in the plane of symmetry of another set.

Figure 40:
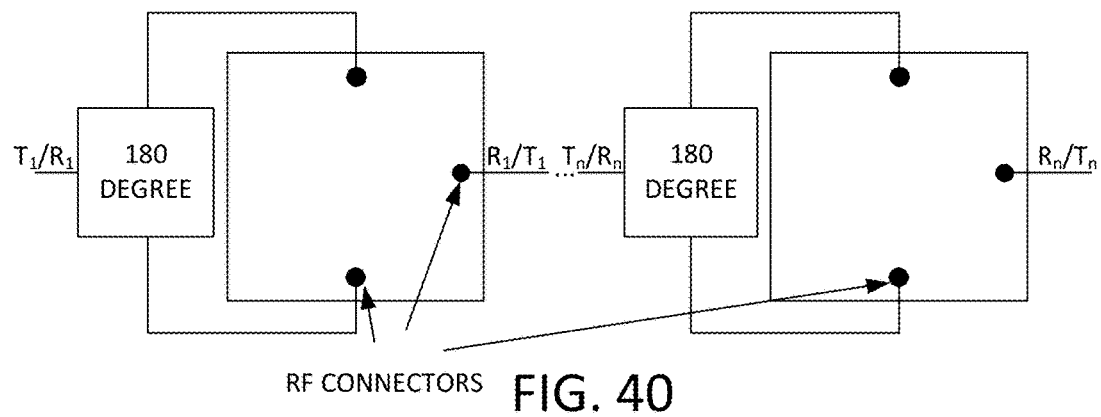
FIGS. 40, 41 show the generalization for the realization of three-dimensional pair-wise symmetrical antennas in 2.5 dimensions.
Figure 41:
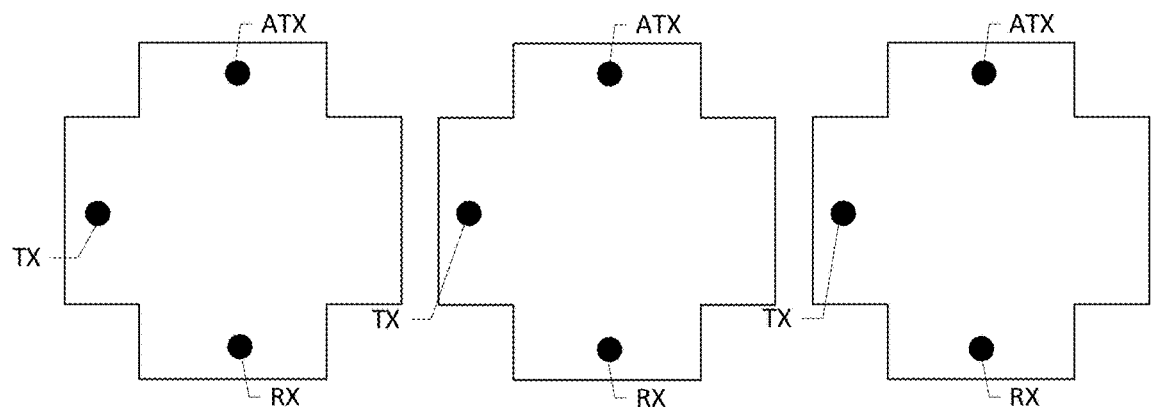

FIG. 40, 41 show the generalization for the realization of three-dimensional pair-wise symmetrical antennas in 2.5 dimension (using patch structure above ground plane) to MIMO, wherein a single antenna is used for transmit and receive.

Antenna design examples herein are provided for the case where physically different antennas are used to transmit and to receive. However, it will be understood that most of the discussions and results are still applicable when the same antenna is used for both transmit and receive (with transmit/receive chains properly isolated).

A full-duplex wireless radio can be considered as a two-port network and therefore it can be described it terms of scattering parameters, i.e., $S_{11}$, $S_{12}=S_{21}$ and $S_{22}$. In some embodiments, an objective may be to provide a small coupling between transmit and receive antenna, i.e., $S_{12}=S_{21}$ should be a small quantity, including reflections from the surrounding environment, sources of imperfections in hardware realization or additional coupling through parasitic elements. It may also be desired to have small $S_{11}$ and $S_{22}$, to provide good antenna efficiency. Moreover, the above two conditions may be satisfied over the entire frequency range of operation. To achieve the desired low coupling, which is heavily affected by reflections from surrounding environment, sources of imperfections in hardware realization or additional coupling through parasitic elements, it is desirable in certain embodiments to have a much lower coupling between antennas themselves. Methods described herein provide such low couplings.

It should be pointed out that the low coupling requirement in full-duplex radio is different from that of MIMO systems. A common assumption for the study of MIMO systems is that the channels between different transmit and receive antennas are independent and identically distributed (i.i.d.). This is achieved by spacing the antennas sufficiently far apart. In practice, due to constraints on the physical dimensions of communication devices, the distances between the multiple antennas are usually small. This renders the channel between different antennas correlated. The correlation between the antennas reduces both the capacity and the diversity gains of the MIMO system. As a result, in MIMO systems, antenna gains to a distant antenna should be independent of each other and that is generally difficult to satisfy when antennas are too close. For low coupling in full-duplex radio, however, transmit and receive antennas should induce a small signal on each other (say a coupling of much less than −40 dB). Using the techniques herein, such antennas can be placed close to each other, while having a small coupling (i.e., small value of $S_{12}=S_{21}$) over frequency band of interest.

Since transmit and receive units in a full-duplex radio can be very close to each other, the effect of near-field is remarkable. Even though E and H fields' relationship can be very complex in near field, it can be predicted and therefore managed using the Maxwell equations. According to Maxwell's equations, geometrical symmetry in structure (shape, material, boundary conditions) and excitation (antenna feed terminals) leads to geometrical symmetry in wave. The geometrical symmetry in wave can then be used to cancel self-interference.

Remaining degradations in receive signal can be further reduced by forming an appropriate digital or analog corrective signal and applying it in the base-band (or IF). This may be an attractive option to account for the degradations that are caused by non-linear operations such as rounding, lack of precision in FFT/IFFT etc.

In addition to above techniques for self-interference cancellation prior to A/D, various embodiments include methods of base-band signal processing to further reduce the self-interference. Note that, unlike A/D, the Digital-to-Analog (D/A) conversion is a linear operation. As a result, the equivalent Transmit-to-Receive Base-band Channel (TRBC) for the remaining self-interference (residual self-interference) is linear and, by measuring this equivalent channel, the remaining amount of self-interference can be subtracted from the receive signal at the base-band. This is achieved by measuring TRBC using pilot tones, which are weighted with self-cancellation beam-forming coefficients to achieve the initial RF signal cancellation. The properly preprocessed tones (using the estimated auxiliary channel response $H_2$ and the estimated self-interference channel response $H_1$) are used simultaneously (in a manner similar to the primary and auxiliary signals) such that the corresponding self-interference terms are subtracted in RF prior to A/D. After training is complete, knowing the TRBC, also referred to herein as the residual self-interference baseband channel response, as well as the transmit signal, the receiver chain may subtract the residual self-interference in the base-band through an operation similar to equalization (referred to as "self equalization"). A precise measurement for the TRBC is beneficial, and this may be achieved in some embodiments by sending multiple pilots in time and averaging the measured TRBC. Furthermore, adaptive methods may be used to adjust the number of pilots, and also avoid degradation in performance of self-interference cancellation due to imprecise measurement of TRBC. Finally, in case there are additional error components, e.g., due to numerical inaccuracies and rounding, described herein are further methods to reduce such error components in the digital domain. Aspects relevant to self equalization are described assuming OFDM. However, techniques herein will be applicable if OFDM is replaced by some other known alternatives, e.g., CDMA, OFDM-CDMA, DS-CDMA, TDMA, constellation construction/transmission in time with pulse shaping and equalization.

Interference reduction in base-band may be achieved by measuring the residual self-interference baseband channel response. Because the self-interference is known, the remaining interference due to digital data truncation at the transmitter can be subtracted digitally. Cancelling self-interference is a simpler task as compared to traditional equalization. The reason is that in cancelling self-interference, the reference of time, frequency, phase, and clock are all local and accurate.

Although the injection of the corrective signal can be performed in several ways, in the examples of FIGS. 42 and 43, the concepts are expressed in the language of using multiple transmit antennas with corrective beam-forming. The procedure is as follows. Pilots (disjoint in time) are transmitted from each TX antenna to measure their corresponding channel, resulting in $$H_1 + \Delta H_1$$

and $$H_2 + \Delta H_2$$

for the first and second coupling channels, respectively. Then, low power self-cancelling (i.e., with proper weighting) pilots are sent simultaneously from the two antennas resulting in:

$$H_1(H_2 + \Delta H_2)(P + \Delta P) - H_2(H_1 + \Delta H_1)(P + \Delta P)$$

We have, $$H_1(\Delta H_2)(\Delta P) - H_2(\Delta H_1)(\Delta P) \approx 0$$

The residual self-interference channel is then equal to:

$$H_1(\Delta H_2) - H_2(\Delta H_1))$$

Under these circumstances, it is assumed that the OFDM data frame, including a possible computational error term, is equal to:

$$(\Gamma + \Delta \Gamma)$$

As a result, received signal is:

$$H_1(H_2 + \Delta H_2)(\Gamma + \Delta \Gamma) - H_2(H_1 + \Delta H_1)(\Gamma + \Delta \Gamma) =$$

In this case, the term:

$$H_1(\Delta H_2)(\Gamma) - H_2(\Delta H_1)(\Gamma)$$

is cancelled by base-band self-interference cancellation using the baseband residual self-interference cancellation signal. In some embodiments, the remaining term:

$$H_1(\Delta H_2)(\Delta \Gamma) - H_2(\Delta H_1)(\Delta \Gamma)$$

can be compensated digitally, as all its components are known, and subsequently compensated by the baseband processor. In particular, the ideal signal may contain too many bits of resolution due to the calculations performed by the IFFT, for example. Thus, the digital signals generated at the primary and auxiliary transmitters may be truncated prior to digital to analog conversion. In an alternative embodiment, the analog self-interference cancellation may be performed by pre-processing only the auxiliary transmit signal, rather than both the primary and auxiliary transmit signals. In this embodiment, the auxiliary transmit signal is pre-processed using the combined estimates of $H_1$ and $H_2$:

$$-\frac{H_1 + \Delta H_1}{H_2 + \Delta H_2}$$

When the pre-processed auxiliary signal passes through the auxiliary channel $H_2$, the received interference channel $Tx(H_1)$ will be reduced by destructive interference from the auxiliary transmit signal that is received at the receiver after passing through channel $H_2$, or, $$Tx\left(-\frac{H_1 + \Delta H_1}{H_2 + \Delta H_2} H_2\right),$$

which will be close enough to $Tx(H_1)$ to significantly reduce the self-interference in the analog domain. The remaining residual error resulting from imperfect channel estimates $H_1$ and $H_2$, can then be determined as described above, by measuring the effective net-residual error at baseband. The residual error may be generally referred to as $\Delta H_{NET}$.

Embodiments of methods of training the full-duplex transceiver will now be described. The corrective signal may be implemented in the OFDM base-band and may be obtained by weighting each tone of the primary transmit signal by a proper value to cause the cancellation. In this case, there exist three channels from the base-band of the transmit chain to the base-band of the receive chain within the same full-duplex node. These are: i) the self-interference channel from the primary transmit signal to receive at base-band, denoted as PTX. ii) the self-interference correction channel from the auxiliary (corrective) signal to receive base-band, denoted as ATX. iii) the baseband residual self-interference channel from the combined transmit signal to receive base-band. These measurements are performed in three steps as explained next and shown in the flow chart of FIG. 42.

With respect to FIG. 42, one method 4200 of training the full-duplex transceiver is described. At 4202 the self-interference channel response is estimated by transmitting a training sequence from the primary transmit antenna (PTX) and then measuring the baseband channel response in the receiver baseband. The effect on each tone of the OFDM signal may be measured to obtain $H_1$, which may be designated $C_{PR}(f)$, for all frequencies ($\forall f$). Then, the self-interference cancellation channel is measured at 4204 in a similar manner; by transmitting a training sequence from the auxiliary transmit antenna (ATX) and measuring the baseband channel response at the receiver. The effect on each tone of the OFDM signal may be measured to obtain $H_2$, which may be designated $C_{AR}(f)$, $\forall f$. In these first two measurements, it is sufficient to transmit separate pilots to measure the first and the second channels explained above (in each OFDM tone) and then compute the weights such that the two signals cancel each other at the receive baseband. The weights may be combined to form a single set of weights applied to the auxiliary transmit signal. To avoid division, and thereby improve computational accuracy, in some embodiments the transmit signal and the corrective signals may have their own weights. For example, if the two channels are $H_1$ and $H_2$, it is sufficient to use $GH_2$ and $-GH_1$ as weights where G is selected to adjust the transmit energy. In particular, in some embodiments to the energy normalization factor may be computed as:

$$G(f)=1/\sqrt{C_{PR}^2(f)+C_{AR}^2(f)},$$

and the normalized weights may be applied to the PTX and ATX signals.

After this stage of training, a base level of cancellation will be achieved. It is generally not possible to have perfectly accurate measurements for these weights. The reason is that we are dealing with large quantities, while interested in measuring error terms that are relatively small. As a result, various imperfections, including additive noise, affect the accuracy. The operations described herein exploit the property that as D/A is linear, measurements for analog cancellation do not need to be accurate. Any error in these measurements will act as an additional parasitic linear system. As a result, the equivalent channel for the residual self-interference remains linear and can be used in conjunction with OFDM. This means, as long as we fix the filters computed for active cancellation (with whatever error they may contain) and then accurately measure the equivalent channel for the residual self interference including the effects of the added filters, we can successfully apply the final stage of digital cancellation in base-band.

The transmit-to-receive channel for the remaining self-interference (residual self-interference) will be the third channel to be measured at 4206. This channel is separately measured in the third step by using weighted pilots as the primary and secondary signals by using the weights computed in the first two stages of channel measurements explained above. Specifically, new pilot tones are transmitted from the primary and auxiliary channels using the weights (i.e., the channel estimates, or normalized channel estimates $H_1$, $H_2$) previously calculated, and the impact of the residual interference is measured at the baseband of the receiver.

Knowing this channel, the remaining self-interference can be subtracted at receive base-band during full-duplex operation. A number of embodiments have been explained in terms of using two filters, and performing the filtering in the frequency domain. It will be clear to individuals skilled in the area, that a single filter applied to the auxiliary corrective signal can replace the two filters. It will be also clear to individuals skilled in the area, that filtering can be also performed in the time domain To improve accuracy of measuring the residual self-interference channel, methods described herein such as method 4300 may be used to send several training sequences and repeating the measurement several times to determine averaged results. Method 4300 includes measuring the baseband residual interference channel at 4302. At 4304 the mean and variance of the measurements of each tone may be calculated. In one embodiment, if the variance of the repeated measurements is below a desired threshold (4306), then the residual channel coefficients may be set accordingly, and normal full-duplex data transmission may be commenced. Alternatively, a maximum number of residual baseband channel measurements may be reached (4306) and the training may be terminated. In either case, additional testing may be utilized to set the baseband channel response at 4308. In one embodiment, the measurements of each tone may be used to generate a metric for comparison to a threshold. In one such embodiment, the baseband processor of the receiver may determine whether the mean (for a given tone) divided by its respective variance is below a threshold. In the event that it is below a threshold then the baseband response may be set to zero, indicating that the contribution of the residual interference is negligible at that frequency. Thus, the first stage of self-interference reduction using analog cancellation may result in cancelling most of the interference, and consequently, the residual self-interference (and weights for its equivalent base-band channel) may become too small. On the other hand, if the ratio is above the threshold, the baseband residual response may be set equal to the calculated mean for that tone, and used as a weighting factor in the subtraction of residual self-interference until the next round of training.

A further method 4400 of some embodiments will be described with reference to FIG. 44. The method comprises: in a full duplex transceiver, generating an interference-reduced signal at 4402 by combining an analog self-interference cancellation signal to an incoming signal that includes a desired signal and a self-interference signal, wherein the analog self-interference cancellation signal destructively adds to the self-interference signal to create a residual self-interference signal; processing the interference-reduced signal 4404 to further reduce the residual self-interference signal using a baseband residual self-interference channel estimate.

The method 4400 may utilize an analog self-interference signal in the radio frequency range. Furthermore, in alternative embodiments, the analog self-interference signal is an intermediate frequency or baseband signal. In still further embodiments, the analog self-interference signal is combined in an inphase signal path and a quadrature signal path. In some embodiments, the self-interference signal incorporates a self-interference channel response and an estimate of an auxiliary channel response, and the self-interference cancellation signal incorporates an auxiliary channel response and an estimate of the self-interference channel response.

The method 4400 may also include determining the baseband residual self-interference channel estimate from transmitting test tones that incorporate an estimate of an auxiliary channel response and an estimate of an interference channel response and measuring a corresponding residual error signal. In some embodiments, the test tones also incorporate a power normalization factor.

As described herein, the method 4400 may use a coupler to combine the self-interference cancellation signal with the incoming signal, or it may be transmitted from an auxiliary antenna of the full-duplex transceiver. The auxiliary antenna of the full-duplex transceiver is configured to have a high-coupling to a receive antenna of the full-duplex transceiver.

The self-interference signal is received over a self-interference channel that includes a propagation path from a primary transmit antenna of the transceiver to a receive antenna of the transceiver, wherein the primary transmit antenna is pair-wise symmetrical to the receive antenna.

An alternative method 4500 is described with respect to FIG. 45, comprising: determining 4502 an estimate of a self-interference channel response from a primary transmitter of a transceiver to a receiver of the transceiver and determining an estimate of an auxiliary channel response from an auxiliary transmitter of the transceiver to the receiver; determining 4504 a residual self-interference baseband channel response at a baseband processor of the receiver; preprocessing 4506 a primary transmit signal and preprocessing 4508 an auxiliary transmit signal with the estimated auxiliary channel response and a negative of the estimated self-interference channel response, respectively; transmitting 4510 the preprocessed primary transmit signal and the preprocessed auxiliary transmit signal in a transmit frequency range; receiving 4512 a desired signal within a receive frequency range substantially overlapping the transmit frequency range, and receiving a residual self-interference signal; reducing 4514 the residual self-interference signal using the residual self-interference baseband channel response; and, further processing 4516 the desired signal.

The method 4500 may include determining an estimate of a self-interference channel response by transmitting a plurality of tones from the primary transmitter and receiving them at the receiver and measuring the effect of the self-interference channel on the tones. In some embodiments, the tones are an orthogonal frequency division multiplexed (OFDM) signal. The method 4500 may include determining an estimate of an auxiliary channel response by transmitting a plurality of tones from the auxiliary transmitter of the transceiver and receiving them at the receiver and measuring the effect of the auxiliary channel on the tones.

Further corrections in the 1st stage (e.g., clipping) may also be undertaken. One or more further stages of correction may be applied to the corrected signal in base-band. In a 2nd stage, asynchronous cancellation may be performed in a time domain. In a 3rd stage, synchronous cancellation and equalization may be performed in an OFDM domain. In a 4th stage, compensation for intentional signal clipping in the 1st stage, A/D residual signal correction, and compensation for numerical inaccuracies in operations such as filtering etc. can be performed in a digital time domain. In a further aspect, in the 2nd stage (time domain), the node may listen for signals to detect a request-to-join signal transmitted by a new client who wishes to join the network without prior timing or frequency co-ordination.

Figure 46:
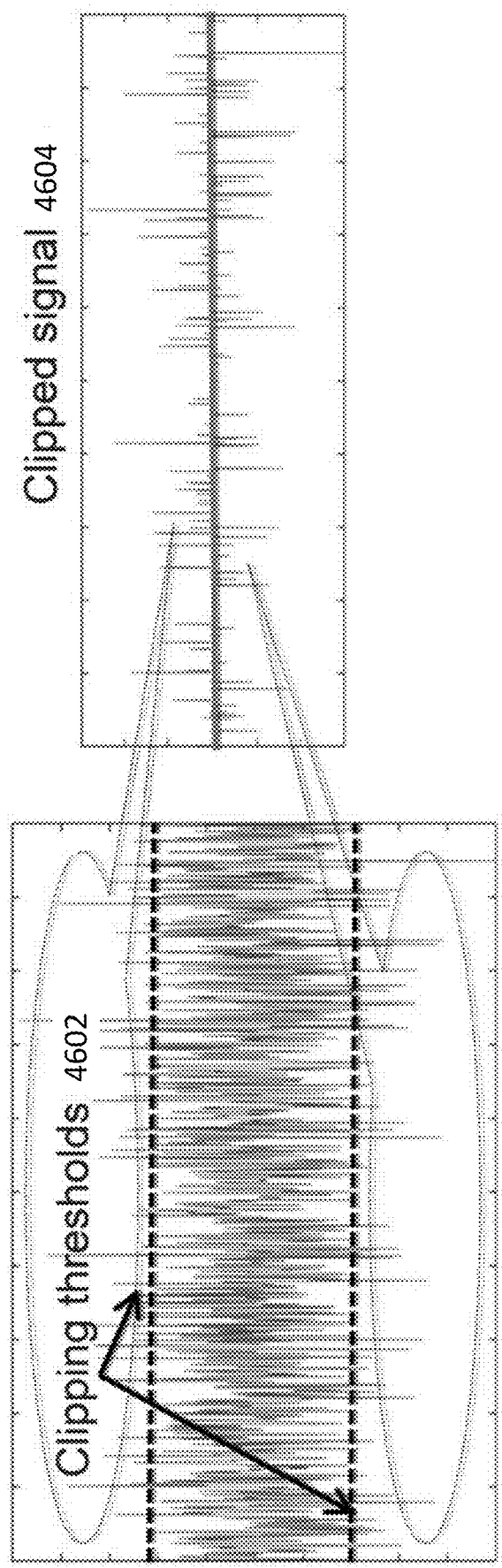
FIG. 46 shows a signal plot regarding clipping.

FIG. 46 shows a schematic view of clipping an incoming signal prior to A/D to reduce its dynamic range, wherein an approximation for the part that is removed is subsequently compensated at the base-band. If needed, the received analog signal can be clipped prior to A/D (not shown) to reduce its dynamic range using clipping thresholds 4602 and provide a clipped signal 4604. The clipped part can then be digitally compensated (accounting for only the TX signal) in base-band.

Figure 47:
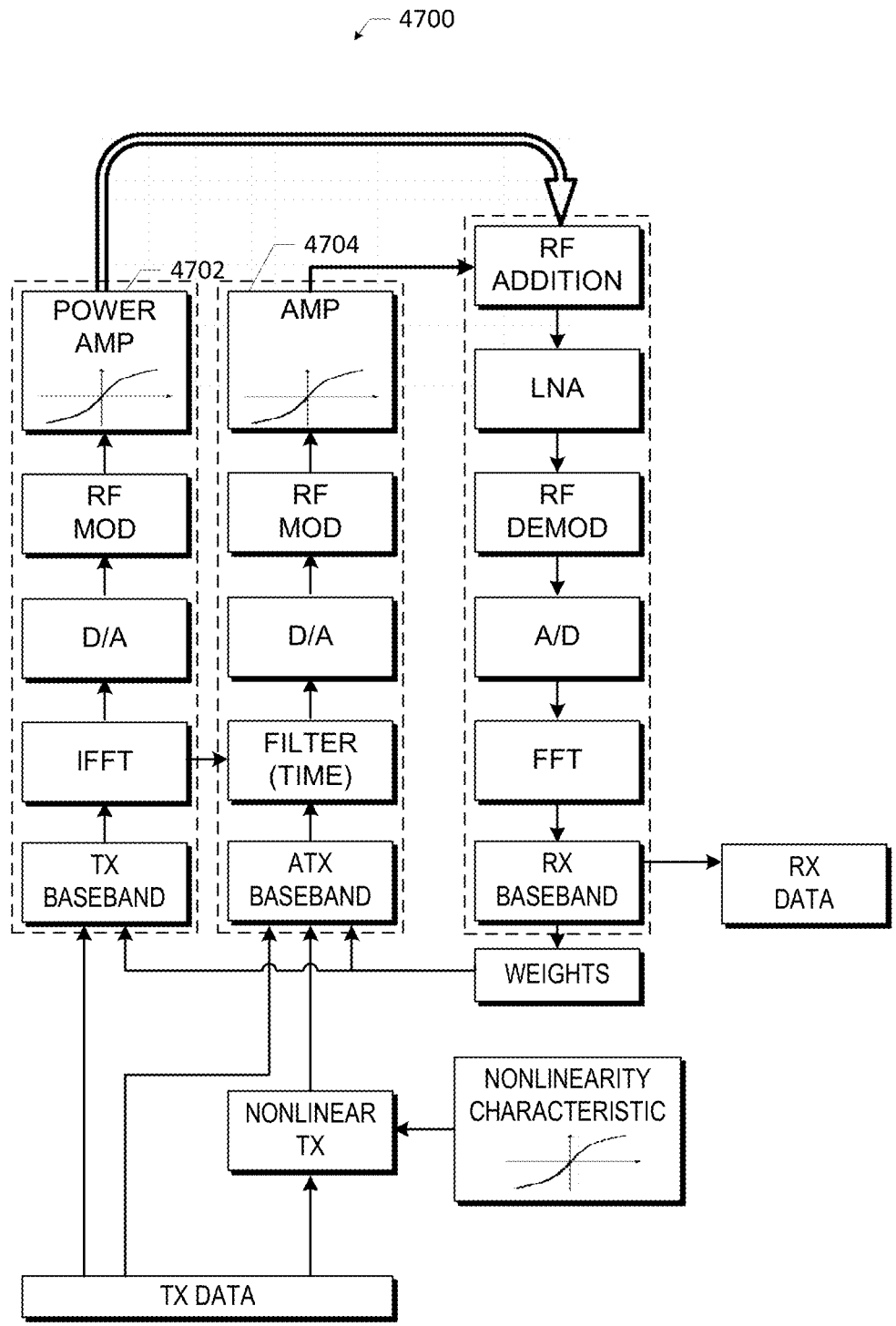
FIG. 47 shows a transceiver having nonlinearities.
Figure 48:
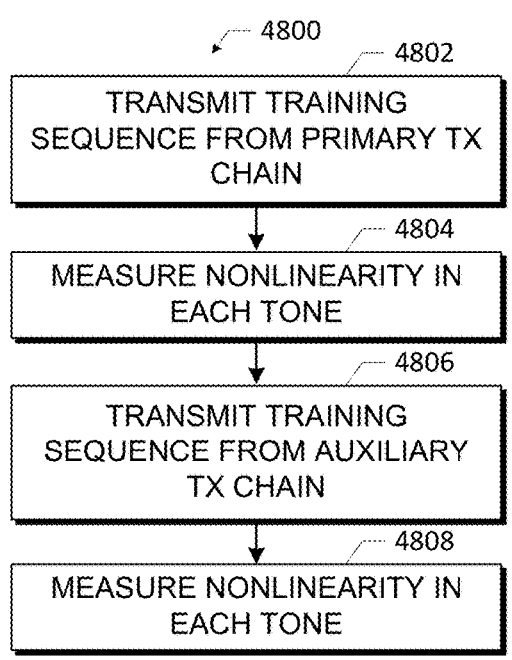
FIGS. 48 and 49 show embodiments of methods to correct for nonlinearities.

FIG. 47 shows a transceiver 4700 with non-linear amplifiers 4702, 4704. FIG. 48 is a flowchart illustrating a method 4800 for training a wireless full-duplex communication device to determine nonlinearities to perform compensation for nonlinearities in accordance with an embodiment. At 4802 the transmitter generates a training sequence for transmission through the primary transmitter chain. The transceiver then measures 4804 the nonlinearity in each tone in terms of its harmonics (magnitude and phase) that leak into other tones. In an alternative embodiment, the training sequence is a periodic triangular signal, and the nonlinear characteristics are captured in terms of a set of parameters such as slope of gain vs. amplitude, or parameters of a Volterra series, or a Volterra series enhanced by vector quantization of error. At 4806 and 4608, the similar procedure is executed for the auxiliary transmit chain.

In practice, components such as Power Amplifier (PA) and LNA exhibit non-linear characteristics. In another aspect of this invention, such nonlinearities are measured through occasional training and their inverse is applied in the construction of the corrective signal such as the resulting signal cancel the effective self-interference in the analog domain. Subsequently, the effect of remaining nonlinearities and other inaccuracies such as those due to mathematical errors in FFT/IFFT calculation and filtering is accounted for in digital domain in the process of digital self-interference removal. The nonlinearities of PA and LNA can be modeled using memory-less polynomials acting in the time domain sample by sample, or their versions with memory known as Volterra series. Models based on polynomials or Volterra series can be used for coarse modeling followed by Vector Quantization (VQ) for modeling the remaining error. This can be also achieved by fitting a model, e.g., models based on Sigmoid Function, or more generally Generalized Logistic Function, and finding the parameters of the model through training and applying its inverse to form the proper corrective signal. As an alternative, the parameters of the inverse function can be directly computed through training.

Figure 49:
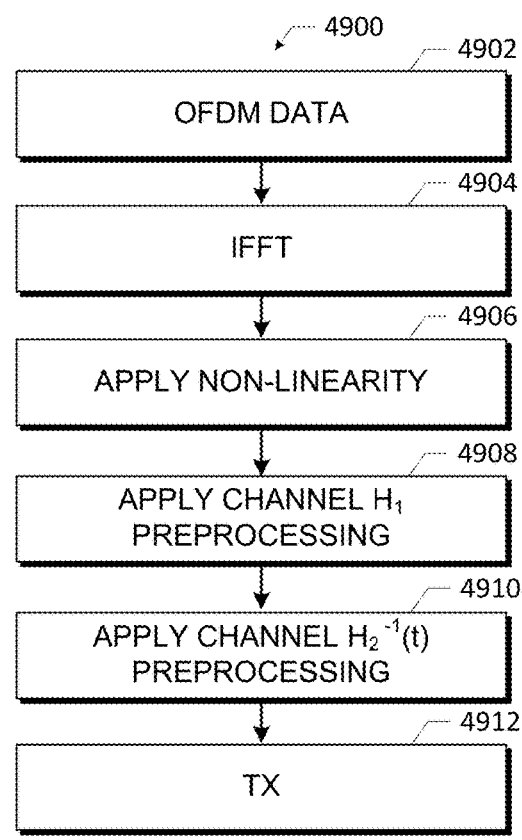

Method 4900 of FIG. 49 may be used to correct for nonlinearities in the primary transmitter. The OFDM data 4902 may be converted to the time domain by IFFT processor 4904. The nonlinearity function (as measured) is then applied to the time-domain signal at 4906. Note that $H_1$ may be measured as described above by sending low power pilots that do not cause much nonlinear distortion in the power amplifier. The signal may then be preprocessed according to channel response $H_1$ (4908) and $H_2$ (4910) in the time domain, although frequency domain processing may be performed. To increase accuracy in the cancellation, the filtering may also account for the initial conditions due to the previous OFDM symbols. That is, filtering can be applied continually in time to capture the memory effects. The filtered signal may then be preprocessed 4910 according to the auxiliary channel response (or, more particularly, its negative inverse). Filtering may again be in the time or frequency domain. As this phase of filtering is IIR (infinite impulse response), it may account for the initial condition due to the previous OFDM symbols and first subtracts the effect of this condition prior to filtering or alternative IIR filtering can be applied continually in time to capture the memory effects. Note also that the ATX chain is may be designed with high coupling to avoid the need for amplification in the ATX chain, and consequently the ATX chain is fairly linear.

Further corrections may be made to account for numerical errors. Wireless transmission is usually based on using small constellations with a small number of points, for example 16QAM or 64QAM. For this reason, not many bits are needed to represent the constellation values. To limit potential numerical errors, a small number of bits may be required to represent the constellation values, say 3 bits per I/Q in the case of 64QAM. The main operation increasing the number of bits at the transmitter is the operation of iFFT (to convert the OFDM signal to time domain). If calculations lack proper accuracy, then an additional error term is introduced which, as mention above, is known in the digital domain and can be compensated at the final stage.

The systems and methods also support the use of Multiple Input Multiple Output (MIMO) antennas, and can handle multiple clients that are separated using OFDMA. This means support for full-duplex connection over each OFDM tone while achieving additional gains, in terms of multiplexing and/or diversity gains, offered by MIMO antennas. In addition, new clients may join the OFDMA network without prior synchronization with other clients.

Figure 50:
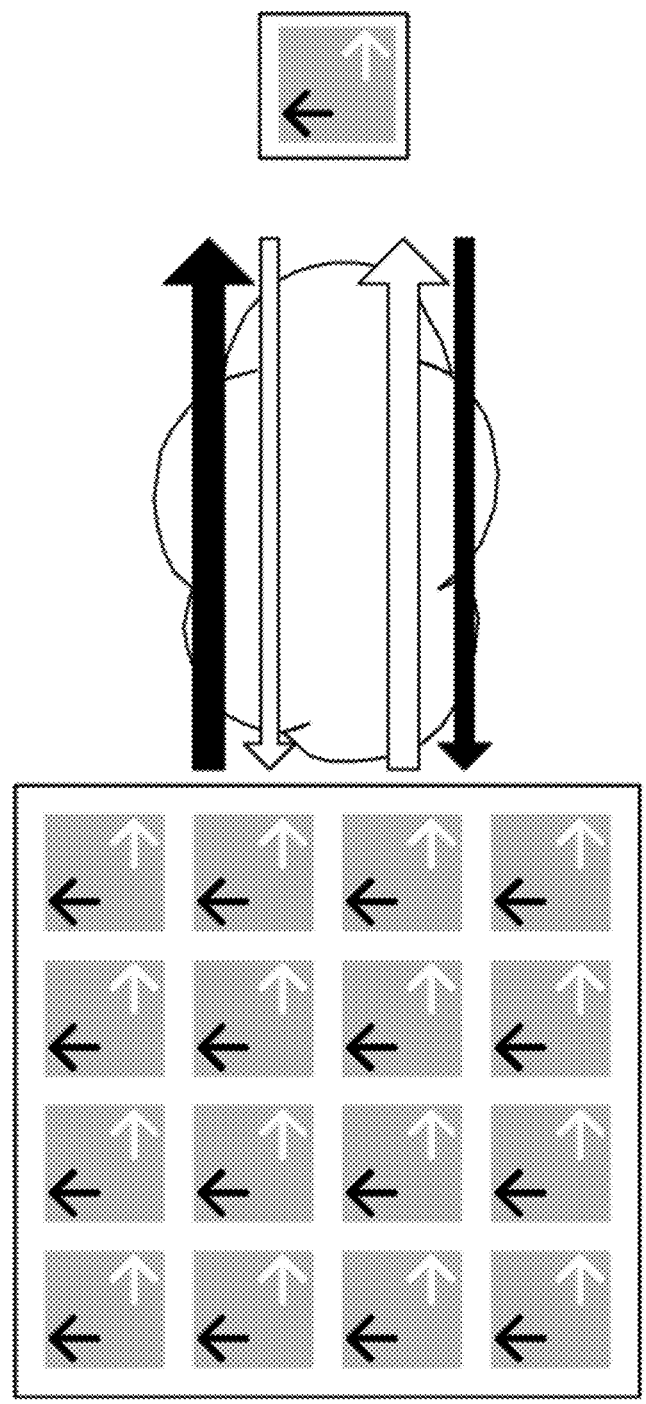
FIG. 50 is a MIMO embodiment.

FIG. 50 shows a schematic view of a MISO/SIMO system, where (1) main transmitting node has several independent radios, (2) main receiver node has one radio, (3) each radio has two antennas with low coupling capable of working in TX mode, or in RX mode, and switching between TX and RX modes, (4) antennas in each of the two nodes are grouped into two sets which alternate as transmit and receive antenna sets, (5) the two sets in the transmitting and receiving nodes switch between transmit/teaching and receive/learning modes in subsequent blocks, (6) main transmitter performs beam-forming to reduce transmit energy for the purposes such as energy saving, interference reduction, enhancing security, signaling below noise level, etc.

Although this invention is explained in terms of using OFDM for channel equalization similar concepts are applicable to other means of signal equalization such as time domain equalization, pre-coding plus time domain equalization and time domain signaling with frequency domain equalization. Although this invention is explained in terms of using OFDMA for multi-user multiplexing, similar concepts are applicable to other means of multi-user multiplexing, such as CDMA, TDMA and SDMA.

ASYNCHRONOUS CONTROL NETWORK

Figure 53:
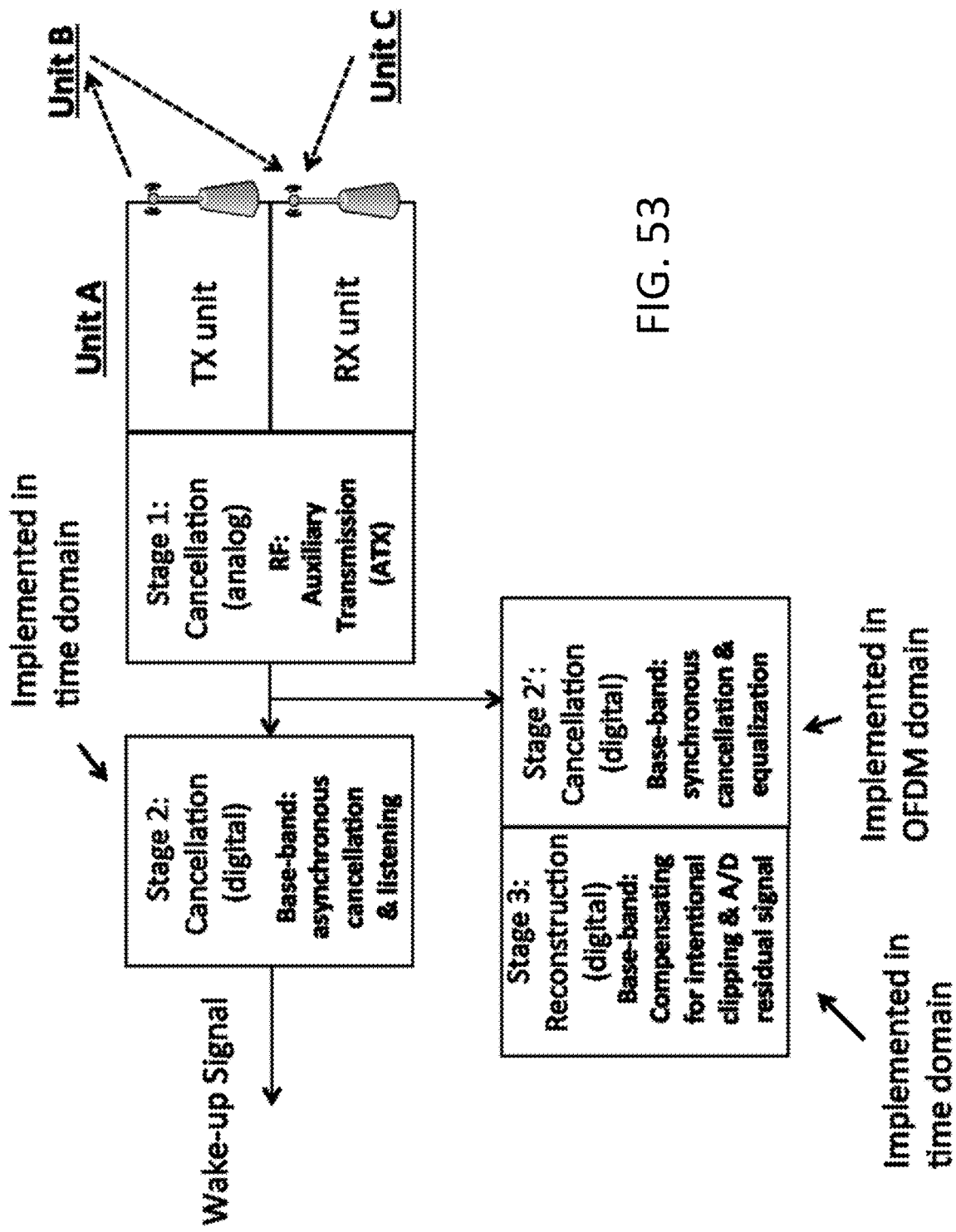

In many applications, it is desirable that new clients, through sending request-to-join signal, can join an existing OFDMA network without prior co-ordination. To handle such situations, this invention includes an additional stage of self-interference cancellation in time domain to enable the Base-Station (BS) or Access Point (AP), or any other node, to continually monitor its incoming signal in search for such a request-to-join signal. FIGS. 51, 5, and 53 show the block diagrams for three examples of implementing such an additional detection stage. Once such a signal is detected, the node allocates resources to the new client and synchronizes it with the rest (i.e., synchronization within the cyclic prefix of the underling OFDM scheme). Aspects relevant to asynchronous users are described assuming OFDMA. However, techniques herein will be applicable if OFDMA is replaced by some other known alternatives, e.g., CDMA, OFDM-CDMA, DS-CDMA, TDMA, constellation construction/transmission in time with pulse shaping and equalization, Space Division Multiple Access (SDMA), and their possible combinations.

This description provides systems and methods wherein control signals are transmitted as part of the return channel. In particular, one of the nodes inserts pilots in its transmit signal to help in synchronizing distant nodes. Note that without such a reference signal, the degradation in effective Signal-to-Noise Ratio (SNR) due to poor synchronization is usually quite significant, even in point-to-point connections. In the past, such issues have limited the use of high order constellations in wireless systems. Methods of this invention pave the road towards implementing large size constellations as used for example in DSL. This invention also includes methods to use part of the return channel to facilitate operations such as Automatic-Repeat-Request (ARQ), power control and adaptive transmission.

To handle asynchronous clients, receiving node (e.g., AP) will be always listening to detect a valid request-to-join signal, while supporting full-duplex connections to its current clients. This is made possible by a stage of self-interference cancellation (digital self-equalization) that is implemented in time domain. FIGS. 51-53 show examples for the implementation of different cancellation stages. This time domain cancellation stage informs the AP of the new incoming client. AP will then perform the necessary procedures such that the new client can join the network synchronized with other clients.

In most practical systems, several repetitions of a sequence (i.e., several periods of a periodic sequence) are used as the request-to-join signal. Once such a signal passes through the linear system corresponding to the channel, it results in an almost periodic sequence of the same period. This can be detected at the receiver end by using a simple correlation calculation by sliding two consecutive windows of the length of that period, shifting them through the incoming signal sample by sample, and computing the inner product of the vectors within the two windows. This produces a peak when the periodicity starts, and this peak will continue until the periodicity lasts. The phase at the peak value provides the frequency offset. It should be ensured that the self-interference does not cause complete loss of this correlation peak. The added stage of self-interference cancellation in time domain serves this purpose.

FIGS. 51-53 show three schematic views of a middle interference removal stage in time domain to enable a unit to detect a request-to-join signal transmitted by a new client who wishes to join the network without prior timing co-ordination. FIGS. 51 and 52 show schematic views of a middle interference removal stage in time domain to enable the unit to detect a request-to-join signal transmitted by a new client who wants to join the network without prior timing or frequency co-ordination;

Note that correlation calculation on its own provides a significant boost in signal to noise. To make sure this periodicity remains detectable in the presence of self-interference, this invention has included this additional stage of self-interference cancellation in the time domain. The corresponding filter in time domain can be obtained by converting the OFDM filter to time and this filter does not need to completely cancel the self-interference, all that is needed is some reduction in the amount of self-interference such that the periodic signal coming from the new client is detectable. As this added stage is linear, it will not contradict with the property needed to have an OFDM structure such that the channel can be measured in order to cancel the residual self-interference by subtraction in base-band (self equalization). For this reason, in FIG. 51 the output of this stage is connected to the next stage of cancellation. As mentioned earlier, this concatenation can be avoided and in this case the task of the time domain self-interference cancellation block is merely to inform the unit of the presence of the new client (FIG. 53). An advantage of this setup is that the coefficients of the time-domain cancellation filter could be calculated using the OFDM channel measurements performed for the purpose of self equalization. FIG. 52 shows a different realization combining some of the features of the methods in FIGS. 51 and 53.

In the following, the details are explained using FIG. 51, but similar statements are applicable to FIGS. 52 and 53. As illustrated, Unit A is communicating with client Unit B in full-duplex and client Unit C desires to join and communicate with Unit A. Unit A comprises a transmit unit 1302 and receive unit 1304, for example comprising pair-wise symmetrical antennas as described. The respective transmit and receive chains are configured to provide 1st stage cancellation 1306 in the RF, for example via auxiliary transmission (ATX) as described. A 2nd stage cancellation 1308, in the base-band, provides asynchronous cancellation and listening in the time domain. In FIG. 52 the 2nd stage provides a wake-up signal. A 3rd stage cancellation 1310 in the base-band performs synchronous cancellation and equalization in the OFDM domain while a fourth stage cancellation 1312 in the base-band compensates for intentional clipping (FIG. 12) and any A/D residual signal in the time domain as described.

Figure 54:
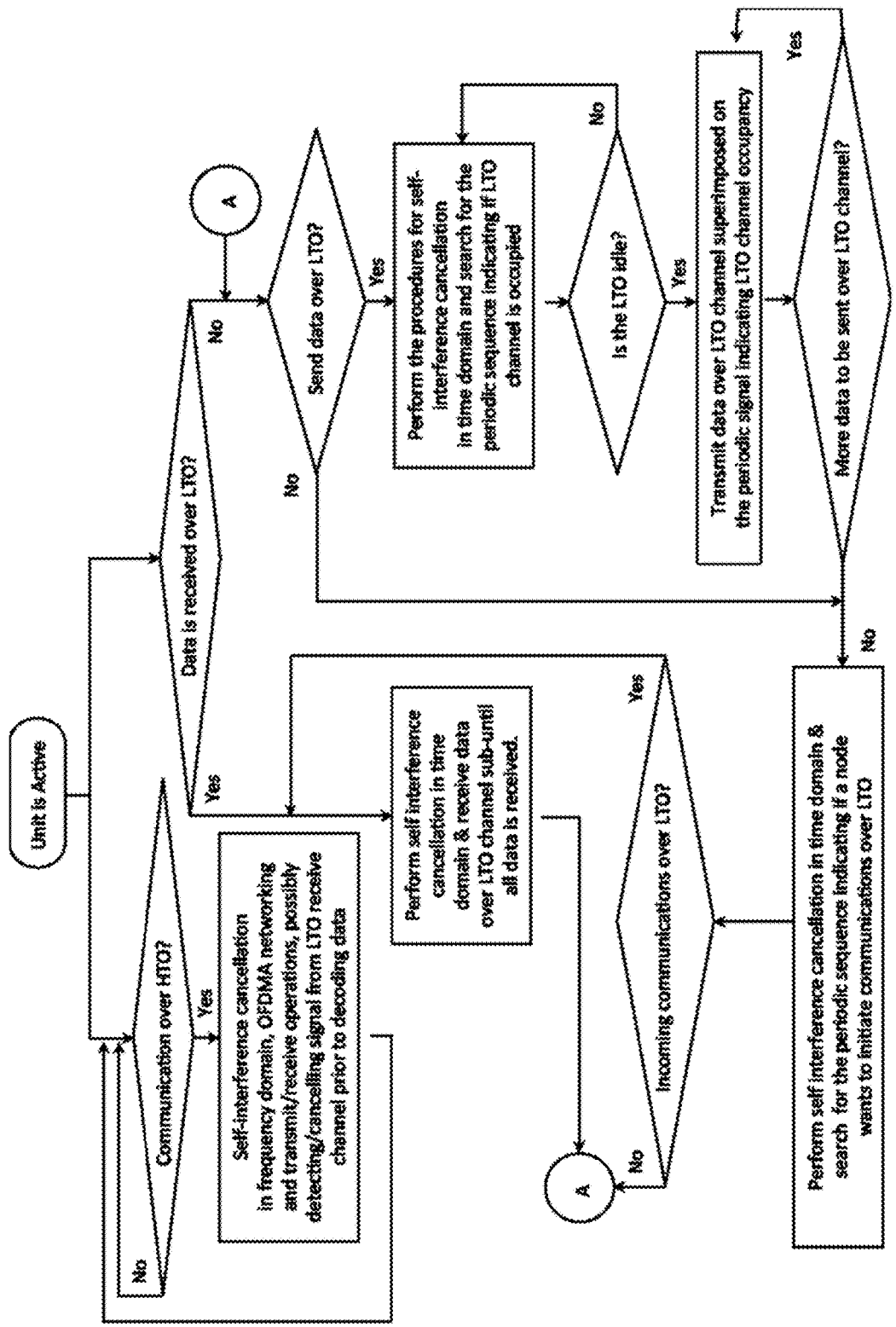
FIG. 54 is a method of operating an asynchronous control network.

FIG. 54 is a flowchart showing a method with operations for a wireless communication device for establishing and/or handling communications over a Low Throughput Overlaid (LTO) channel asynchronously and in parallel (i.e. with overlap in time and frequency) with communications over a Higher Throughput Main (HTM) data channel in accordance with one embodiment. FIG. 4 is a flowchart showing a method with operations 5400 for a wireless communication device for establishing and/or handling communications over an LTO channel asynchronously and in parallel with communications over an HTM data channel in accordance with one embodiment. It will be understood that operations 5402-5404 relate to HTM data channel communications and operations 5406-5422 relate to LTO channel communications. Respective operations may be performed by respective subunits of the wireless communication device. FIG. 54 applies to either access point, or client. In particular any unit which may get involved in ad-hoc or mesh networking should have equal capabilities in this respect. However, in a simple network setup, clients may use the LTO channel in the uplink to announce their presence, and then listen for response from the AP in the HTM channel.

At 5402, a determination is made whether the communications are over the HTO. If no operations return to the start of operations 5400. If yes, operations perform self-interference cancellation in frequency domain, OFDMA networking and transmit/receive operations, possibly detecting/cancelling signal from LTO receive channel prior to decoding data.

At 5406, a determination is made whether data is received over LTO channel. If yes, at 5408, operations perform self-interference cancellation in the time domain and receive data via the LTO channel until all data is received. If data is not received, there may be data to send over the LTO channel (determination at 5410). If yes, at 5412, operations perform self-interference cancellation in the time domain and search for the periodic sequence indicating if the LTO channel is occupied. At 5414 operations determine whether the LTO channel is idle (i.e. available for the communication device). If no, operations return to 5412 to try again. If yes, at 5416 data is transmitted over the LTO channel superimposed on the periodic signal indicating LTO channel occupancy. At 5418, a determination is made whether more data is to be sent over the LTO channel. If yes, operations return to 5416. If not, at 5420 the device performs self-interference cancellation in the time domain and searches for the periodic sequence indicating if another node (device) wants to initiate communications over the LTO channel. If at 5422 there is no incoming communication over the LTO channel, operations may continue at 5410. If yes, operations continue at 5408 as previously described.

A further embodiment includes a method of operating a wireless communication network for establishing communication between a Central Node, e.g., Access Point (AP), Base-station (BS), and respective multiple clients with two-way wireless links, i.e., complete or partial overlap in time as well as in frequency, the wireless communication node comprising a Multiple-Input Multiple-Output (MIMO) antenna system The method may comprise: receiving a request-to-join signal from a new client without prior coordination, and with overlap in time and frequency with the existing clients, and wherein, a central node is continually listening to detect a valid incoming request-to-join signal, or other forms of control signaling, of any client while communicating with the multiple clients of the existing network using full-duplex connectivity for both data and control flow.

The central node utilizes a first stage of base-band self-interference cancellation is followed by an algorithmic base-band block, which works synchronously with the transmit signal of a central node A to detect the request-to-join signal and subsequently trigger a sequence of operations required for the node B to join the network associated with node A, or perform other network management operation such as bandwidth allocation and scheduling.

The method may include the multiple clients being connected to the central node sharing a common spectrum using Orthogonal Frequency Division Multiple Access (OFDMA). The method may also use neighboring nodes, that by listening to each other while transmitting, collaborate in the subsequent transmission symbol(s), or collaborate in subsequent transmission block(s).

The method may include part of a return link used as a control channel to, at least one of: send pilots for synchronization; coordinate retransmission of erroneous frames in ARQ without severely interrupting a forward link; coordinate adaptive coding and modulation and power control based on the quality of the forward link, e.g., using channel gain or features of observed multi-user interference across frequency; feedback the channel state (phase, magnitude, polarization) in an asymmetric link wherein transmitter node posses many antennas and rely on beam-forming in terms of channel state (phase, magnitude, polarization) to achieve high reliability with low transmit energy (e.g., below noise level); and, feedback features of its received signal to improve the capacity of the forward link in an interference channel.

The method may include the central node using part of a forward link to broadcast a common pilot to be used by other nodes for synchronization and thereby enabling joint decoding in a multiple access channel or in an interference channel.

The method may be used in a MIMO-SDMA network environment wherein part of a return link from each receiver node is used to periodically feedback its corresponding channel state, and wherein part of a forward link from a main transmitter node is used to periodically broadcast a common pilot for synchronization.

The method may also be used in a network environment wherein nodes periodically listen while transmitting to measure features of their observed multi-user interference terms, for example energy of interference in different frequency segments, and accordingly adjust their transmit/receive strategies.

Methods may also include, in a cognitive transmission network, wherein primary users are distinguished by a signature signal, e.g., a periodic preamble, to be sent at the beginning of their transmission, and wherein primary users start transmission without attention to the channel occupancy by the secondary users, secondary users will be continually listening and searching for the signature of the primary users, and, wherein secondary users adjust their transmission parameters once the signature of the primary users is detected, e.g., stop their transmission and continue with the remaining part at a later time when the network becomes once again available to secondary users.

Methods may also include users that are distinguished by a signature signal according to their class of service, e.g., CDMA codes which are superimposed on their main signal, and wherein users check for the channel occupancy, detect the class of the users using the channel, and adjust their transmission strategy accordingly.

In further embodiments, methods for overlaying a network of Low Throughout Control (LTC) links on top of the High Throughout Main (HTM) data links with overlap in time and frequency may be included, and wherein, to enable cancellation on the HTM channel, transmission on the LTO channel uses signaling schemes with low power and thereby low spectral efficiency.

The LTO transmitter may send several periods of a periodic signal in time domain, which are detected by a correlation calculation using sliding windows, and wherein the presence of such a signal indicates incoming control data, and wherein the amplitude and/or phase and/or duration of a basic periodic signal are varied (with respect a starting periodic signal used as a preamble) to embed the control data, and wherein data on LTO includes Forward Error Correction (FEC) with a short block length.

To avoid collisions, an overlaid signature signal is used to indicate occupancy of the LTO channel, and wherein nodes which are interested to participate in the overlay control network will sense the LTO channel and transmit if the channel is idle, e.g., by searching for the basic periodic signal as a sign of LTO channel being idle or occupied, and wherein LTO links use a back-off strategy, e.g., similar to the CSMA protocol used in 802.11, among themselves, and wherein, HTM links operate with relatively higher power, and wherein, nodes involved in signaling over HTM links first search for the LTO signal, detect its timing and synchronize with it, perform signal detection on it, and then (partially or fully) cancel the LTO signal to reduce its harmful interference effect on their respective HTM link.

The methods may use a full duplex link to form a closed loop between a transmitter and its respective receiver, wherein the control signals (affecting the channel impulse response) are adjusted relying on closed loop feedback, e.g., using methods known in the context of adaptive signal processing.

Still further, the methods may be used even when at least one of the clients does not have full-duplex capability. In further embodiments, apparatuses are provided such as a wireless communication node configured to perform a method according to those set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless communication node, comprising:
a processor; and
a non-transitory computer-readable storage medium storing instructions that, when executed by a processor, cause the wireless communication node to:
in a communication network, establish with a plurality of clients full-duplex wireless links with at least partial overlap in time and frequency, the full-duplex wireless links comprising an uplink data channel, an uplink control channel, a downlink data channel, and a downlink control channel;
receive incoming control channel communications over the uplink control channel while communicating with at least one first client over the downlink data channel;
transmit downlink control channel communications over the downlink control channel while communicating with the at least one first client over the uplink data channel;
receive over the uplink control channel the incoming control channel communications that include a request-to-join signal from a second client to join the communication network while maintaining the full-duplex wireless links with the at least one first client, wherein the second client is an asynchronous client that requests to join the communication network without prior timing or frequency coordination; and
responsive to a receipt of the request-to-join signal from the second client over the uplink control channel, perform self-interference cancellation to at least partially cancel (i) interference between the downlink control channel and the uplink data channel, and (ii) interference between the downlink data channel and the uplink control channel, wherein performing the self-interference cancellation comprises performing at least a first stage of baseband self-interference cancellation to detect the request-to-join signal from the second client, wherein the first stage of baseband self-interference cancellation is performed in a time domain, and wherein the first stage of baseband self-interference cancellation is performed asynchronously with the incoming control channel communications including the request-to-join signal from the second client.

2. The wireless communication node of claim 1, wherein receiving the incoming control channel communications over the uplink control channel while communicating with the at least one first client over the downlink data channel comprises continually listening to detect a valid incoming uplink control signal, the valid incoming uplink control signal including the request-to-join signal from the second client, while communicating with the at least one first client over the downlink data channel.

3. The wireless communication node of claim 1, wherein the instructions, when executed by a processor, further cause the wireless communication node to:
following the receipt of the request-to-join signal from the second client for active association with the communication network, perform synchronization, bandwidth allocation and scheduling with the second client; and
after the synchronization, the bandwidth allocation and the scheduling, admit the second client to the communication network.

4. The wireless communication node of claim 1, wherein the first stage of baseband self-interference cancellation uses a filter in the time domain, the filter configured to operate synchronously with transmissions from the first wireless communication node and wherein performing the first stage of baseband self-interference cancellation comprises filtering an outgoing baseband signal and subtracting the filtered outgoing baseband signal from an incoming baseband signal in the time domain,
and
wherein the instructions, when executed by a processor, further cause the wireless communication node to:
perform a second stage of baseband self-interference cancellation using an algorithmic base-band detection, wherein the algorithmic baseband detection is performed synchronously with transmitted signals and received signals.

5. The wireless communication node of claim 4, wherein the instructions, when executed by a processor, further cause the wireless communication node to:
measure a baseband channel including effects of the first stage of baseband self-interference cancellation; and
obtain weighting values for the second stage of baseband self-interference cancellation based on the measuring.

6. The wireless communication node of claim 4, wherein the instructions, when executed by a processor, further cause the wireless communication node to:
determine coefficients of the filter.

7. The wireless communication node of claim 6, wherein determining the coefficients of the filter comprises:
computing filter coefficients in a frequency domain; and
converting the filter coefficients into the time domain.

8. The wireless communication node of claim 1, wherein the instructions, when executed by a processor, further cause the wireless communication node to:
perform one or more of distributed modulation, collaborative resource allocation, scheduling and quality of service management to enable collaboration with at least another wireless communication node.

9. The wireless communication node of claim 1, wherein at least one of the uplink control channel or the downlink control channel is configured to carry one or more synchronization pilot signals, to coordinate retransmissions according to automatic repeat requests (ARQs), to provide feedback of channel status, and to provide feedback of received signal data.

10. The wireless communication node of claim 1, wherein the instructions, when executed by a processor, further cause the wireless communication node to:
broadcast a common pilot signal via the downlink control channel to at least another wireless communication node, the common pilot signal enabling joint detection.

11. The wireless communication node of claim 10, wherein the common pilot signal enables joint detection in one or more of a multiple access channel or an interference channel.

12. The wireless communication node of claim 10, wherein the common pilot signal is broadcast periodically to enable one or more clients to measure a state of the first wireless communication node.

13. The wireless communication node of claim 1, wherein the wireless communication node comprises a base station, and wherein the communication network comprises an Orthogonal Frequency Division Multiple Access (OFDMA) communication network.

14. A Multiple-Input Multiple-Output (MIMO) wireless communication node, the MIMO wireless communication node comprising:
a plurality of receive chains;
a processor; and
a non-transitory computer-readable storage medium storing instructions that, when executed by a processor, cause the wireless communication node to:
in a communication network, in a communication network, establish with a plurality of clients full-duplex wireless links with at least partial overlap in time and frequency, the full-duplex wireless links comprising an uplink data channel, an uplink control channel, a downlink data channel, and a downlink control channel;
receive incoming control channel communications over the uplink control channel while communicating with at least one client over the downlink data channel;
transmit downlink control channel communications over the downlink control channel while communicating with the at least one client over the uplink data channel; and
perform self-interference cancellation to at least partially cancel (i) interference between the downlink control channel and the uplink data channel, and (ii) interference between the downlink data channel and the uplink control channel, wherein performing the self-interference cancellation comprises:
performing, in each of the plurality of receive chains, a first stage of baseband self-interference cancellation asynchronously with transmissions from the plurality of clients, wherein performing the first stage of baseband self-interference cancellation comprises subtracting a first linear combination of baseband transmit signals; and
performing, in each of the plurality of receive chains, a second stage of baseband self-interference cancellation synchronously with received signals, wherein performing the second stage of baseband self-interference cancellation comprises subtracting a second linear combination of baseband transmit signals.

15. The MIMO wireless communication node of claim 14, further comprising:
a plurality of receive antennas configured to improve a signal-to-noise ratio of the uplink control channel through diversity.

16. A wireless communication node comprising:
a processor; and
a non-transitory computer-readable storage medium storing instructions that, when executed by a processor, cause the wireless communication node to:
in an Orthogonal Frequency Division Multiple Access (OFDMA) communication network, establish with a plurality of clients full-duplex wireless links with at least partial overlap in time and frequency, the full-duplex wireless links comprising an uplink data channel, an uplink control channel, a downlink data channel, and a downlink control channel;
receive incoming control channel communications over the uplink control channel while communicating with at least one first client over the downlink data channel;
transmit downlink control channel communications over the downlink control channel while communicating with the at least one first client over the uplink data channel;
receive over the uplink control channel the incoming control channel communications that include a request-to-join signal from a second client to join the communication network while maintaining the full-duplex wireless links with the at least one first client, wherein the second client is an asynchronous client that requests to join the OFDMA communication network without prior timing or frequency coordination; and
responsive to a receipt of the request-to-join signal from the second client over the uplink control channel, perform self-interference cancellation to at least partially cancel (i) interference between the downlink control channel and the uplink data channel, and (ii) interference between the downlink data channel and the uplink control channel, wherein performing the self-interference cancellation comprises:
performing a first stage of baseband self-interference cancellation to detect the request-to-join signal from the second client, wherein the first stage of baseband self-interference cancellation is performed in a time domain, and wherein the first stage of baseband self-interference cancellation is performed asynchronously with the incoming control channel communications;
performing a second stage of baseband self-interference cancellation, wherein the second stage of baseband self-interference cancellation is performed in an orthogonal frequency division multiplexed (OFDM) domain, and wherein the second stage of baseband self-interference cancellation is performed synchronously with the incoming control channel communications; and
performing a third stage of baseband self-interference cancellation, wherein the third stage of baseband self-interference cancellation is performed in the time domain, and wherein the third stage of baseband self-interference cancellation performs compensation for signal clipping.

17. The wireless communication node of claim 16, wherein the second stage of baseband self-interference cancellation is further performed to provide equalization in the OFDM domain.

18. The wireless communication node of claim 16, wherein the third stage of baseband self-interference cancellation is further performed to provide compensation for an analog-to-digital residual signal in the time domain.

19. The wireless communication node of claim 16, wherein the received request-to-join signal includes a plurality of periods of a periodic sequence to allow for detection of the request-to-join signal.

20. The wireless communication node of claim 16, wherein the first stage of baseband self-interference cancellation produces a wake-up signal.

* * * * *